(12) United States Patent
Nomoto

(10) Patent No.: US 9,886,281 B2
(45) Date of Patent: Feb. 6, 2018

(54) SIMD PROCESSOR

(71) Applicant: MegaChips Corporation, Osaka-shi (JP)

(72) Inventor: Shohei Nomoto, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 472 days.

(21) Appl. No.: 14/660,253

(22) Filed: Mar. 17, 2015

(65) Prior Publication Data

US 2015/0277928 A1 Oct. 1, 2015

(30) Foreign Application Priority Data

Mar. 26, 2014 (JP) .................................. 2014-064238

(51) Int. Cl.
*G06F 9/30* (2006.01)
*G06F 9/38* (2006.01)

(52) U.S. Cl.
CPC .......... *G06F 9/3887* (2013.01); *G06F 9/3001* (2013.01); *G06F 9/30021* (2013.01); *G06F 9/30043* (2013.01); *G06F 9/30072* (2013.01); *G06F 9/3802* (2013.01); *G06F 9/3885* (2013.01)

(58) Field of Classification Search
None
See application file for complete search history.

(56) References Cited

U.S. PATENT DOCUMENTS

| 5,539,663 | A | * | 7/1996 | Agarwal | .................. H04N 7/15 348/406.1 |
|---|---|---|---|---|---|
| 5,559,722 | A | * | 9/1996 | Nickerson | ................ H04N 7/15 341/50 |
| 8,000,537 | B2 | * | 8/2011 | Park | ........................ G06K 9/74 382/212 |
| 9,251,572 | B2 | * | 2/2016 | Shu | ......................... H04N 1/58 |
| 2011/0107390 | A1 | * | 5/2011 | Shen | ...................... H04N 19/61 725/151 |
| 2012/0099790 | A1 | * | 4/2012 | Lyuh | .................... G06K 9/4642 382/170 |

FOREIGN PATENT DOCUMENTS

| JP | 2012-221131 | 11/2012 |
|---|---|---|
| JP | 2013-238442 | 11/2013 |

* cited by examiner

*Primary Examiner* — Corey S Faherty
(74) *Attorney, Agent, or Firm* — Oblon, McClelland, Maier & Neustadt, L.L.P.

(57) ABSTRACT

A SIMD processor with a versatile hardware configuration performs efficient range determination that is frequently used in image processing and recognition. A SIMD processor includes a range determination arithmetic unit including first and second registers that can store two values. The SIMD processor uses three values, namely, these two values and the value of source data input from a register file unit, to flexibly set the processing target data for range determination and the two boundaries defining the processing target range of the range determination.

12 Claims, 10 Drawing Sheets

Histogram calculation

| | Slot3 | Slot2 | Slot1 | val1 | val2 | src |
|---|---|---|---|---|---|---|
| Cyc0 | Load (grad1) | | | | | |
| Cyc1 | Load (histL2) | | Write (grad1,histL1) | histL1 | grad1 | |
| Cyc2 | Load (histL3) | | RngD (histL1,histL2) | histL1 | grad1 | histL2 |
| Cyc3 | Load (histL4) | Addt | RngD (histL2,histL3) | histL2 | grad1 | histL3 |
| Cyc4 | Load (histL5) | Addt | RngD (histL3,histL4) | histL3 | grad1 | histL4 |
| Cyc5 | Load (grad2) | Addt | RngD (histL4,histL5) | histL4 | grad1 | histL5 |
| Cyc6 | Load (histL2) | Addt | Write (grad2,histL1) | histL1 | grad2 | |
| Cyc7 | Load (histL3) | | RngD (histL1,histL2) | histL1 | grad2 | histL2 |
| Cyc8 | Load (histL4) | Addt | RngD (histL2,histL3) | histL2 | grad2 | histL3 |
| Cyc9 | Load (histL5) | Addt | RngD (histL3,histL4) | histL3 | grad2 | histL4 |
| Cyc10 | | Addt | RngD (histL4,histL5) | histL4 | grad2 | histL5 |
| Cyc11 | | Addt | | | | |

FIG. 6

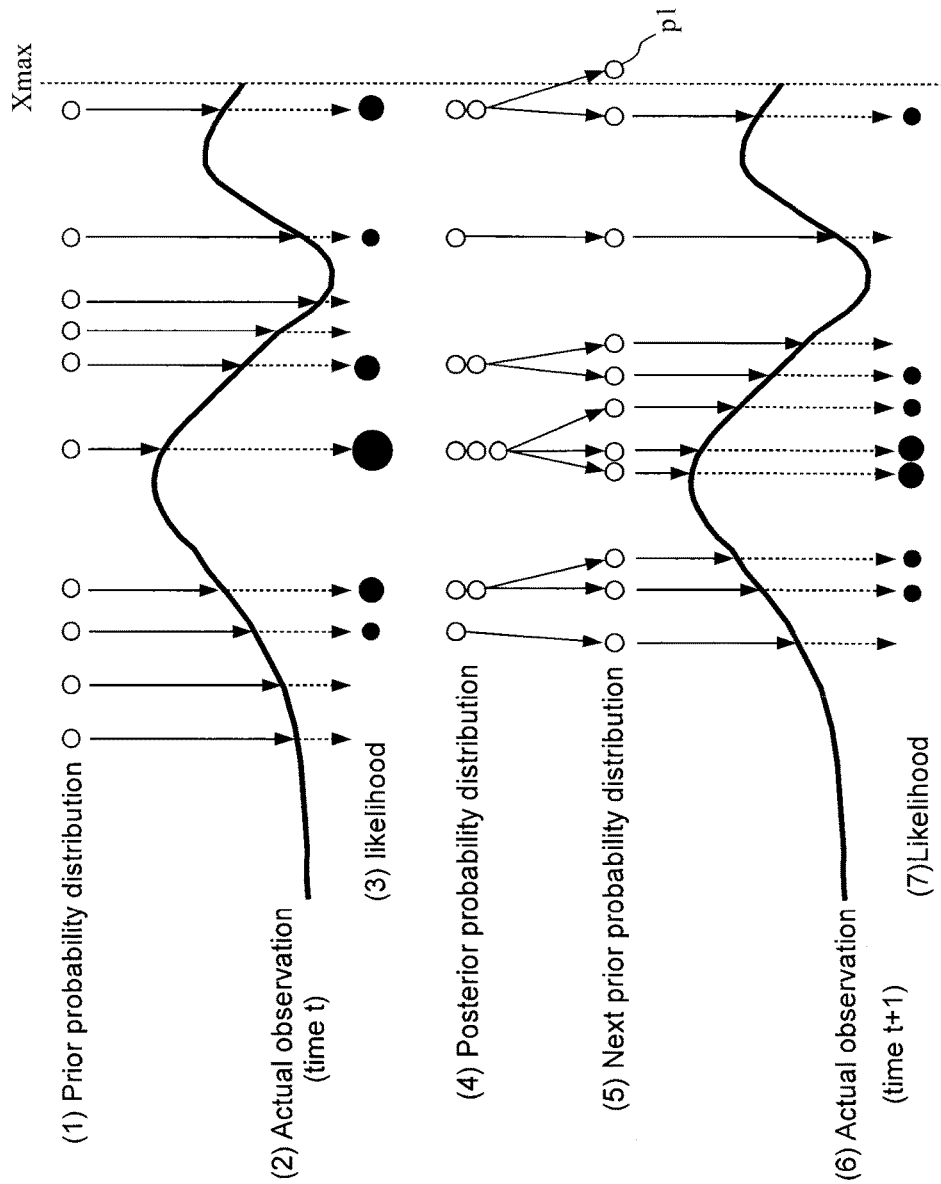

Range determination using particle filtering

| | Slot3 | Slot2 | Slot1 | val1 | src | val2 |
|---|---|---|---|---|---|---|
| Cyc0 | Load (x1) | Rand (Δx1) | | Xmin | | Xmax |
| Cyc1 | | | Add (x1,Δx1) | Xmin | | Xmax |
| Cyc2 | Load (x2) | Rand (Δx2) | RngD (x1+Δx1) | Xmin | x1+Δx1 | Xmax |
| Cyc3 | Load (x3) | Addt (x1,Δx1) | Add (x2,Δx2) | Xmin | | Xmax |
| Cyc4 | Store (x1,Δx1) | Rand (Δx3) | RngD (x2+Δx2) | Xmin | x2+Δx2 | Xmax |
| Cyc5 | Load (x4) | Addt (x2,Δx2) | Add (x3,Δx3) | Xmin | | Xmax |
| Cyc6 | Store (x2,Δx2) | Rand (Δx4) | RngD (x3+Δx3) | Xmin | x3+Δx3 | Xmax |
| Cyc7 | Load (x5) | Addt (x3,Δx3) | Add (x4,Δx4) | Xmin | | Xmax |
| Cyc8 | Store (x3,Δx3) | Rand (Δx5) | RngD (x4+Δx4) | Xmin | x4+Δx4 | Xmax |
| Cyc9 | Load (x6) | Addt (x4,Δx4) | Add (x5,Δx5) | Xmin | | Xmax |
| Cyc10 | Store (x4,Δx4) | Rand (Δx6) | RngD (x5+Δx5) | Xmin | x5+Δx5 | Xmax |

FIG. 8

| range | dir | eq0 | eq1 | Conditions for setting condition flag CF to 1 |
|---|---|---|---|---|
| 0 | X | 0 | 0 | val1 < val2 < src |
| 0 | X | 0 | 1 | val1 < val2 ≦ src |
| 0 | X | 1 | 0 | val1 ≦ val2 < src |
| 0 | X | 1 | 1 | val1 ≦ val2 ≦ src |
| 1 | 0 | 0 | 0 | val1 < src < val2 |
| 1 | 0 | 0 | 1 | val1 < src ≦ val2 |
| 1 | 0 | 1 | 0 | val1 ≦ src < val2 |
| 1 | 0 | 1 | 1 | val1 ≦ src ≦ val2 |
| 1 | 1 | 0 | 0 | src < val1 or val2 < src |
| 1 | 1 | 0 | 1 | src < val1 or val2 ≦ src |
| 1 | 1 | 1 | 0 | src ≦ val1 or val2 < src |
| 1 | 1 | 1 | 1 | src ≦ val1 or val2 ≦ src |

FIG. 9

SIMD PROCESSOR

This application claims priority to Japanese Patent Application No. 2014-064238 filed on Mar. 26, 2014, the entire disclosure of which is hereby incorporated herein by reference (IBR).

BACKGROUND OF THE INVENTION

Field of the Invention

The present invention relates to a single instruction multiple data (SIMD) processor with a very long instruction word (VLIW) architecture.

Description of the Background Art

Image processors have been developed to accommodate various functional changes in image recognition processing.

For example, Patent Literature 1 (Japanese Unexamined Patent Application Publication No. 2012-221131) describes an image processor that performs image recognition using Histogram of Oriented Gradients (HOG).

In such image recognition, the histogram of oriented gradient (HOG) may be generated through the processing (1) to (3) below.

(1) For each target pixel to be processed (with the coordinates (x, y) and the pixel value I (x, y)), a gradient intensity dx(x, y) in X-direction between the target pixel and its adjacent pixels to the right and the left is calculated using the formula below.

$$dx(x,y) = I(x+1,y) - I(x-1,y)$$

A gradient intensity dy(x, y) in Y-direction between the target pixel and its adjacent pixels above and below is then calculated using the formula below.

$$dy(x,y) = I(x,y+1) - I(x,y-1)$$

(2) A gradient vector angle for the target pixel, which is referred to as gradient (x, y), is calculated using the value obtained by dividing the gradient intensity dy(x, y) in Y-direction by the gradient intensity dx(x, y) in X-direction, using the formula below:

$$\text{gradient}(x,y) = \text{atan}(dy(x,y)/dx(x,y)),$$

where atan( ) is an inverse tangent (arctangent).

(3) The calculated gradient vector angle, gradient (x, y), and the signs (plus and minus) of the gradient intensities dx(x, y) and dy(x, y) are used to determine the gradient vector direction of the target pixel. The determined gradient vector direction is used to generate the HOG.

As shown in FIG. 10, for example, bins BIN0 to BIN7 are eight parts equally split by an angle of $\pi/4$. For each target pixel, a bin including its gradient vector direction is determined, and the number of times the gradient vector direction is determined to fall within the bin is counted (added up). This calculation is performed for each of all the pixels of a predetermined image area (e.g. an image area consisting of N×M pixels, where N and M are natural numbers) to generate the HOG of the predetermined image area.

The image processor uses the generated HOG in, for example, image recognition.

This HOG generation may be performed for all the pixels in an image, and thus preferably uses parallel processing. Thus, a SIMD processor is suited to such data processing.

However, the HOG generation involves conditional branching dependent on the gradient vector angle gradient (x, y) to determine the gradient vector direction. A SIMD processor may use a conditional flag for such conditional branching. Each processor element (PE) of the SIMD processor can simply execute its corresponding instruction. To change the processing in accordance with the data value, the processor needs a condition flag for each processor element (PE), and each PE operates in accordance with the condition flag. When performing conditional branching using conditional flags, the SIMD processor would involve many complicated processes. This lowers the computation efficiency.

To solve this problem, the technique in Patent Literature 1 uses an additional operator (hardware) dedicated to the HOG generation. The operator performs the processing to generate HOGs to prevent the computation efficiency from decreasing.

However, the technique in Patent Literature 1 uses a fixed number of HOG bins and a fixed range of each bin (angular range), disabling the number of bins and the range of each bin (angular range) to be variable. The operator (hardware) circuitry dedicated to generating HOGs has no other uses. More specifically, for example, the circuit for range determination used to generate HOGs cannot be used for range determination of other purposes. The range determination is commonly used in image processing and image recognition and thus is preferably implemented in the form of versatile hardware incorporated in the SIMD processor.

In response to the above problems, it is an object of the present invention to provide a SIMD processor with a hardware configuration that enables efficient implementation of range determination commonly used in image processing and image recognition.

SUMMARY

A first aspect of the invention provided a SIMD processor including an instruction control unit, a register file unit, a conditional register unit, an instruction execution unit, a first register, a second register, a selector, a control signal generation unit, a first comparator, a second comparator, and a concatenation unit.

The instruction control unit performs instruction fetching and instruction decoding, and generates a range control signal, a range direction setting signal, a first equivalence control signal, and a second equivalence control signal for performing predetermined operations.

The register file unit includes a plurality of registers including a register storing source data.

The conditional register unit stores a condition flag, and generates a condition control signal for performing a conditional operation in accordance with the condition flag.

The instruction execution unit includes a first slot including a range determination arithmetic unit.

The range determination arithmetic unit receives the source data from the register file unit. The range determination arithmetic unit includes a first register, a second register, a selector, a control signal generation unit, a first comparator, a second comparator, and a concatenation unit.

The first register stores a first register value.

The second register stores a second register value.

The selector selects one of the source data received from the register file unit and the second register value in accordance with the range control signal.

The control signal generation unit generates a first comparison control signal, a second comparison control signal, and a concatenation control signal in accordance with the range control signal and the range direction setting signal.

The first comparator compares a value output from the selector with the first register value in accordance with the first comparison control signal generated by the control signal generation unit and the first equivalence control signal, and generates first comparison data indicating a result of the comparison.

The second comparator compares the source data with the second register value in accordance with the second comparison control signal generated by the control signal generation unit and the second equivalence control signal, and generates second comparison data indicating a result of the comparison.

The concatenation unit concatenates the first comparison data with the second comparison data in accordance with the concatenation control signal to generate the condition flag.

The first register updates the first register value with the source data when the range control signal is inactive.

The conditional register unit stores the condition flag generated by the concatenation unit.

BRIEF DESCRIPTION OF THE DRAWINGS

FIG. 6 is a diagram describing an execution schedule of instructions to generate a HOG.

FIG. 7 is a diagram describing a particle filtering process.

FIG. 8 is a diagram describing an execution schedule of instructions to perform range determination in the particle filtering process.

FIG. 9 is a relational table showing the relationship between the signal values of a control signal range, a range direction setting signal dir, a first equivalence control signal eq1, and a second equivalence control signal eq2, and the conditions under which the range determination arithmetic unit S14 outputs a condition flag CF set at 1 in the SIMD processor 1000.

DESCRIPTION OF THE PREFERRED EMBODIMENTS

First Embodiment

Figure 1:
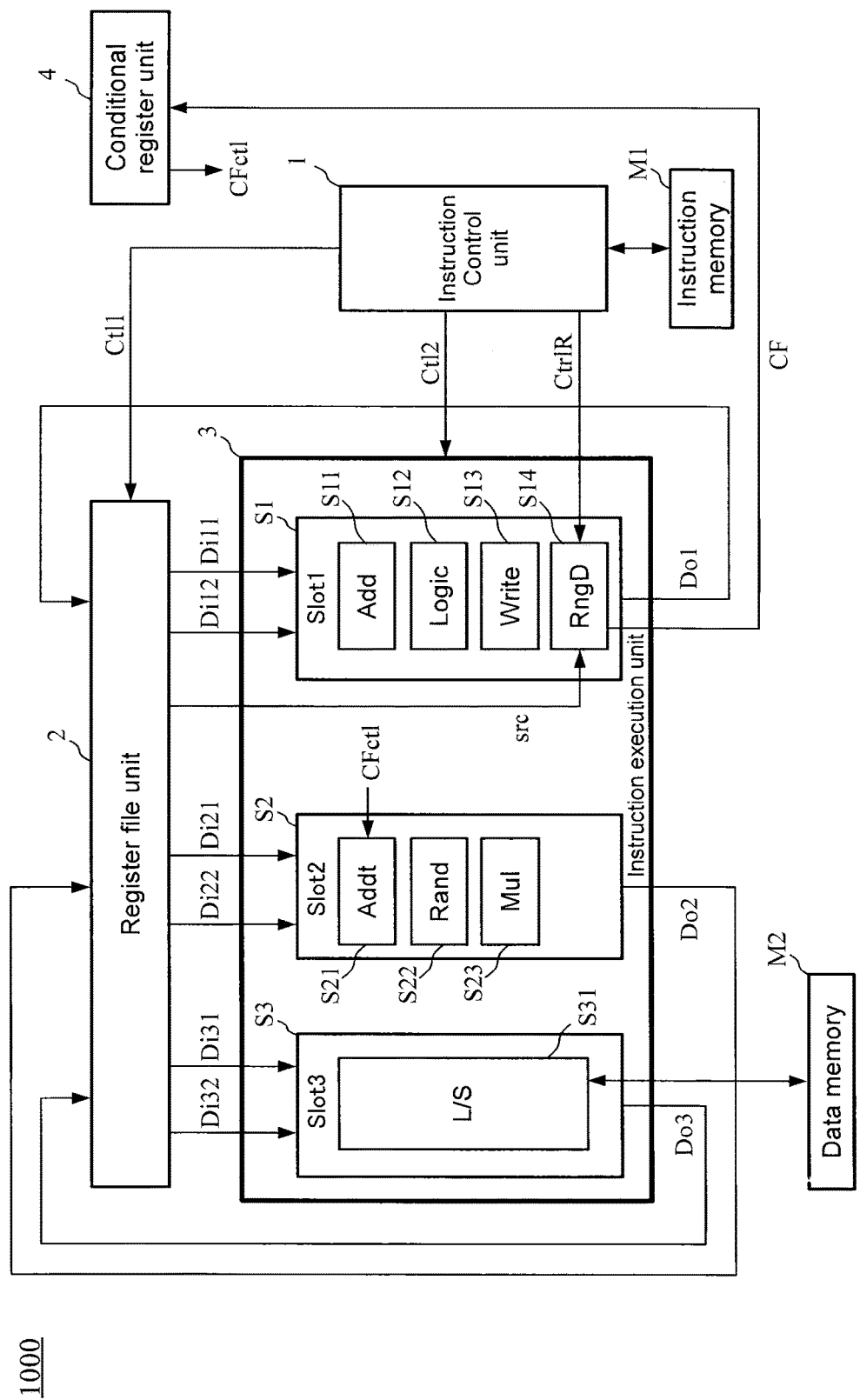
FIG. 1 is a schematic block diagram of a SIMD processor 1000 according to a first embodiment.

A first embodiment will now be described with reference to the drawings.
1.1 SIMD Processor Configuration
FIG. 1 is a schematic block diagram of a SIMD processor 1000 according to the first embodiment.

The SIMD processor 1000 performs operations in N bits and/or in 2×N bits (N is a natural number).

In the example described below, N=16, or more specifically, the SIMD processor 1000 is capable of performing 16-bit operations and 32-bit operations.

As shown in FIG. 1, the SIMD processor 1000 includes an instruction control unit 1, a register file unit 2, an instruction execution unit 3, a conditional register unit 4, an instruction memory M1, and a data memory M2.

The instruction control unit 1 fetches an instruction from the instruction memory M1 (instruction fetching) and decodes the instruction (instruction decoding). The instruction control unit 1 then generates a control signal Ctl1 for controlling the register file unit 2 in accordance with the result of the instruction decoding, and outputs the generated control signal Ctl1 to the register file unit 2.

The instruction control unit 1 also generates a control signal Ctl2 for controlling the instruction execution unit 3 in accordance with the result of the instruction decoding, and outputs the generated control signal Ctl2 to the instruction execution unit 3.

The register file unit 2 includes a plurality of registers. The register file unit 2 outputs data stored in a predetermined register to its corresponding predetermined slot in the instruction execution unit 3 in accordance with the control signal Ctl1. The register file unit 2 also controls a predetermined register to receive data from the instruction execution unit 3 in accordance with the control signal Ctl1.

The instruction execution unit 3 includes a plurality of instruction slots that can perform operations in parallel in one cycle to allow a plurality of instructions to be executed in one cycle (one clock cycle). For ease of explanation, the instruction execution unit 3 in this example includes three instruction slots.

The instruction execution unit 3 includes three slots, namely, a first slot S1, a second slot S2, and a third slot S3 as shown in FIG. 1.

The third slot S3 includes a load-store unit S31, which loads or stores 16-bit data from or into the data memory M2.

The second slot S2 includes a conditional adder unit S21, which performs conditional addition of 16-bit data, a random-number generating unit S22, which generates a random number, and a multiplication unit S23, which multiplies two sets of 16-bit data. The conditional addition may include conditional addition and subtraction, or may be conditional subtraction (the same applies hereafter).

The first slot S1 includes an adder unit S11, which performs addition of 16-bit data, an arithmetic logic unit S12, which performs logical operations of 16-bit data, a data writing arithmetic unit S13, and a range determination arithmetic unit S14, which performs range determination. The addition may include addition and subtraction, or may be subtraction (the same applies hereafter).

The configuration (one example) of the range determination arithmetic unit S14 will now be described with reference to FIGS. 2 to 5.

Figure 2:
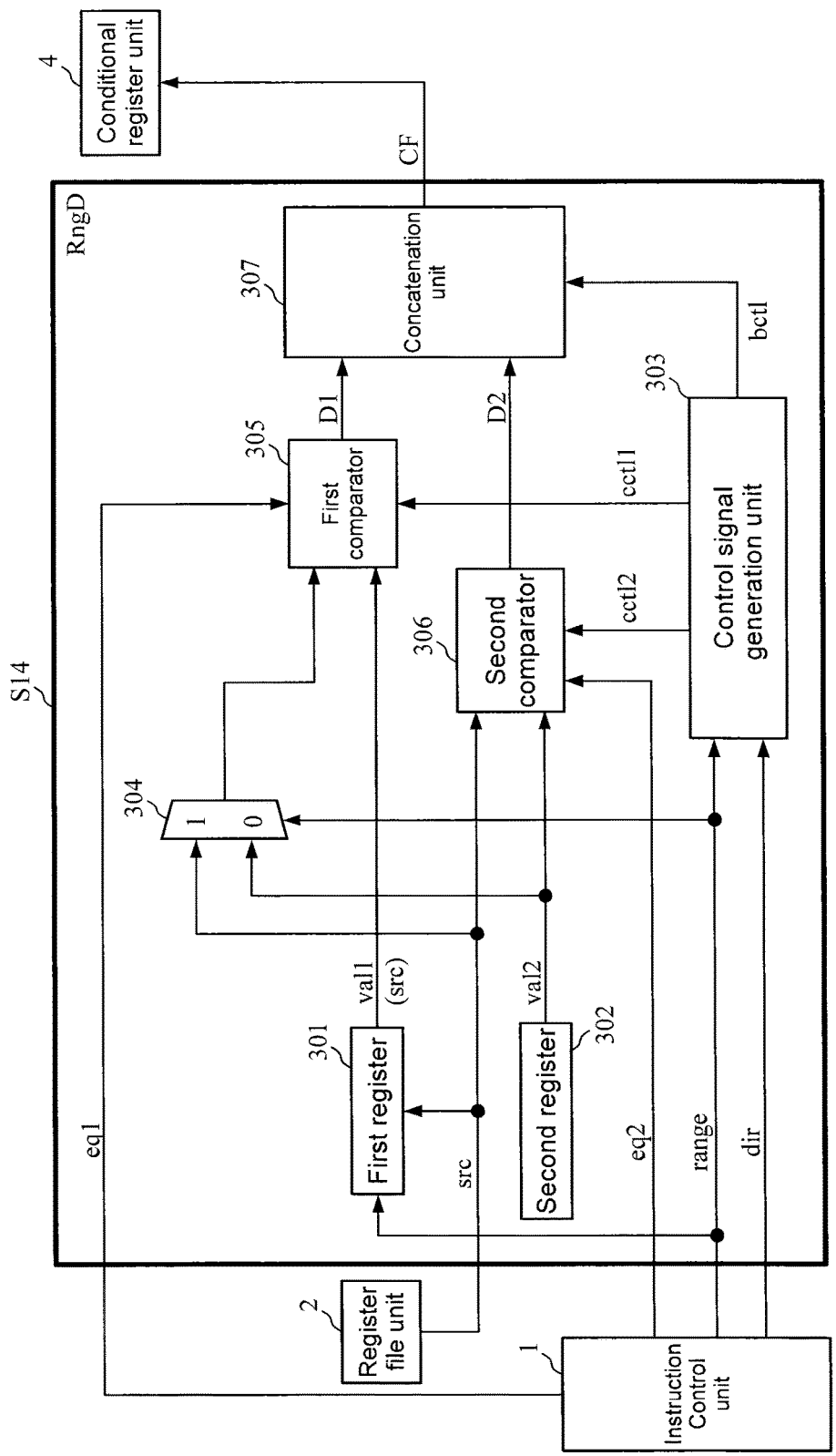
FIG. 2 shows the configuration (one example) of a range determination arithmetic unit S14.

FIG. 2 shows the configuration (one example) of the range determination arithmetic unit S14. FIG. 2 is a schematic block diagram simply showing the instruction control unit 1, the register file unit 2, the conditional register unit 4, and the range determination arithmetic unit S14.

Figure 3:
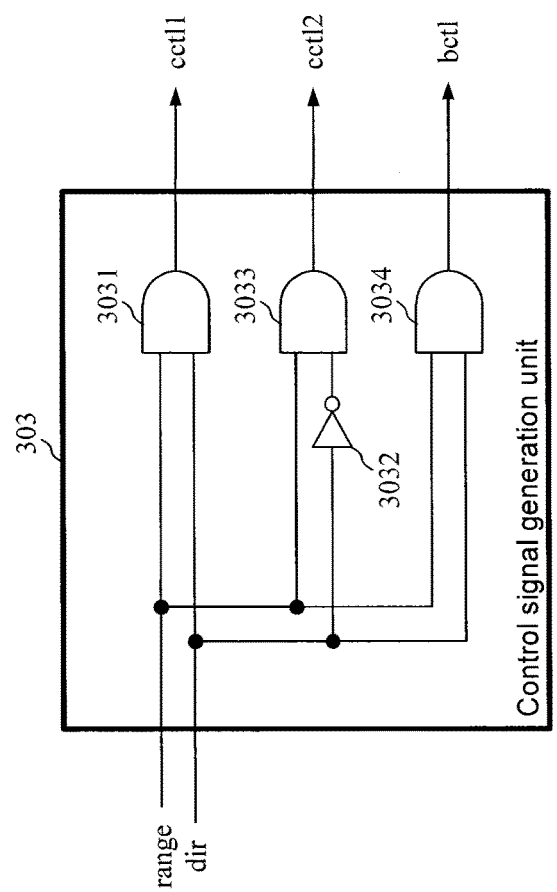
FIG. 3 shows the configuration (one example) of a control signal generation unit 303 in a range determination arithmetic unit S14.

FIG. 3 shows the configuration (one example) of a control signal generation unit 303 included in the range determination arithmetic unit S14.

Figure 4:
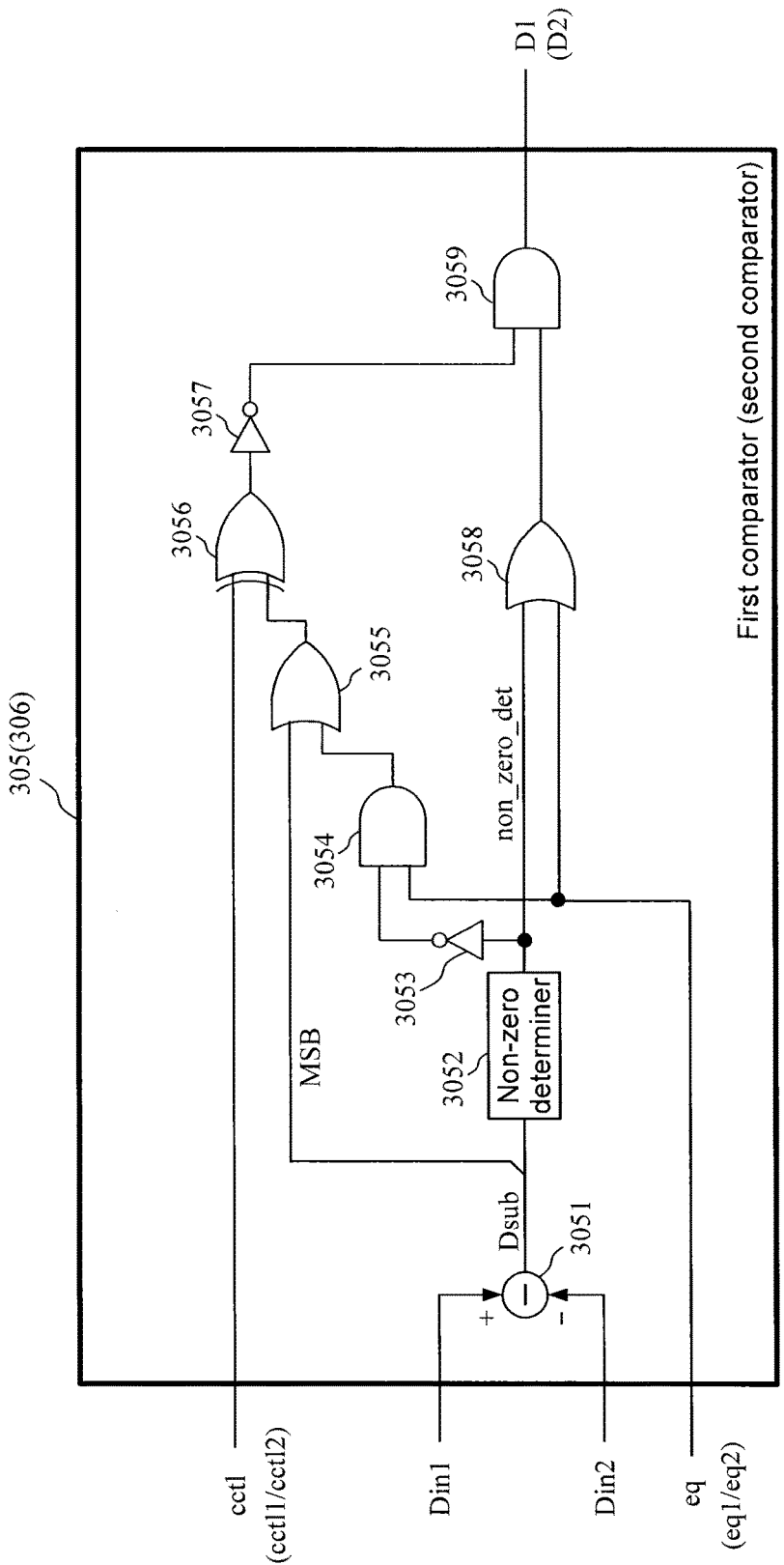
FIG. 4 show the configuration (one example) of a first comparator 305 in the range determination arithmetic unit S14.

FIG. 4 shows the configuration (one example) of a first comparator 305 included in the range determination arithmetic unit S14.

Figure 5:
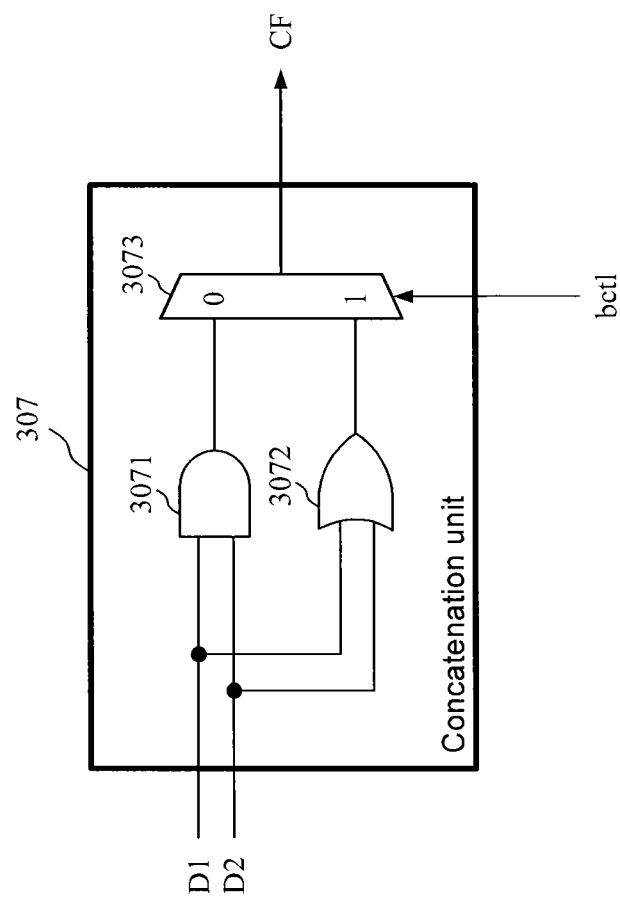
FIG. 5 shows the configuration (one example) of a concatenation unit 307 in the range determination arithmetic unit S14.
Figure 10:
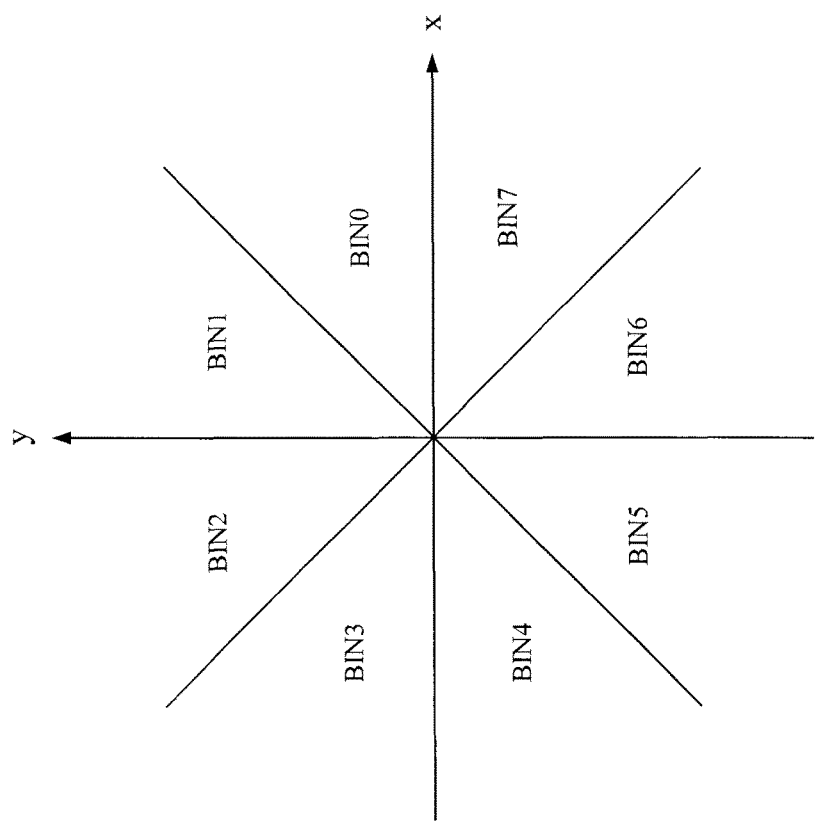
FIG. 10 is a diagram describing eight split bins BIN0 to BIN7 used to calculate a HOG.

FIG. 5 shows the configuration (one example) of a concatenation unit 307 included in the range determination arithmetic unit S14.

As shown in FIG. 2, the range determination arithmetic unit S14 includes a first register 301, a second register 302, the control signal generation unit 303, a selector 304, the first comparator 305, a second comparator 306, and the concatenation unit 307. The control signal CtlR in FIG. 1 corresponds to a control signal range, a range direction setting signal dir, a first equivalence control signal eq1, and a second equivalence control signal eq2 in FIG. 2.

The first register 301 stores a first register value val1. The first register value val1 is set (the data is written) by the data writing arithmetic unit S13. The first register 301 outputs the first register value val1 to the first comparator 305.

The first register 301 receives a control signal range from the instruction control unit 1. The first register 301 also receives data src output from the register file unit 2. When receiving the data src from the register file unit 2, the first register 301 rewrites the first register value val1 to the data src in accordance with the control signal range from the instruction control unit 1, and outputs the data src to the first comparator 305.

The second register 302 stores a second register value val2. This second register value val2 is set (the data is written) by the data writing arithmetic unit S13. The second register 302 outputs the second register value val2 to the selector 304 and the second comparator 306.

As shown in FIG. 2, the control signal generation unit 303 receives the control signal range (1-bit signal) and the range direction setting signal dir (1-bit signal) from the instruction control unit 1.

As shown in FIG. 3, the control signal generation unit 303 includes three AND gates 3031, 3033, and 3034 and a NOT gate 3032.

The AND gate 3031 receives the control signal range and the range direction setting signal dir, and performs an AND operation of the control signal range and the range direction setting signal dir. The AND gate 3031 generates a control signal cctl1 having a signal value indicating the operational result, and outputs the control signal cctl1 to the first comparator 305.

The NOT gate 3032 receives the range direction setting signal dir and performs a NOT operation using this signal, and outputs the operational result to the AND gate 3033.

The AND gate 3033 receives the control signal range and an output from the NOT gate 3032 and performs an AND operation of the control signal range and the output signal from the NOT gate 3032, and generates a control signal cctl2 having a signal value indicating the operational result. The AND gate 3033 outputs the control signal cctl2 to the second comparator 306.

The AND gate 3034 receives the control signal range and the range direction setting signal dir and performs an AND operation between the control signal range and the range direction setting signal dir, and generates a control signal bctl having a signal value indicating the operational result. The AND gate 3034 outputs the control signal bctl to the concatenation unit 307.

The selector 304 receives the data src output from the register file unit 2 and the second register value val2 output from the second register 302. The selector 304 also receives the control signal range output from the instruction control unit 1. The selector 304 selects one of the data src output from the register file unit 2 and the second register value val2 output from the second register 302 in accordance with the value of the control signal range, and outputs the selected data or value to the first comparator 305.

As shown in FIG. 4, the first comparator 305 includes a subtracter 3051, a non-zero determiner 3052, which determines whether the value of input data is 0, a NOT gate 3053, an AND gate 3054, an OR gate 3055, an XOR gate 3056, a NOT gate 3057, an OR gate 3058, and an AND gate 3059. The first comparator 305 compares input data Din1, which is output from the selector 304, with input data Din2, which is output from the first register 301.

The subtracter 3051 receives the input data Din1 and the input data Din2, and performs subtraction of the two data sets. The subtracter 3051 obtains subtraction result data Dsub in the manner below:

$$Dsub = Din1 - Din2.$$

The subtracter 3051 outputs the resultant data Dsub to the non-zero determiner 3052.

The subtracter 3051 also outputs the most significant bit (MSB) of the subtraction result data Dsub to the OR gate 3055. When the data Dsub indicates zero or a positive value, the MSB of the data Dsub is 0. When the data Dsub indicates a negative value, the MSB of the data Dsub is 1.

The non-zero determiner 3052 receives the subtraction result data Dsub output from the subtracter 3051.

(1) When the subtraction result data Dsub indicates 0, the non-zero determiner 3052 sets the value of a determination result signal non_zero_det to 0.

(2) When the data Dsub does not indicate 0, the non-zero determiner 3052 sets the value of the determination result signal non_zero_det to 1.

The non-zero determiner 3052 then outputs the determination result signal non_zero_det to the NOT gate 3053 and the OR gate 3058.

The NOT gate 3053 receives the output from the non-zero determiner 3052 and inverts the received value, and outputs the resultant value to the AND gate 3054.

The AND gate 3054 receives a first equivalence control signal eq1 and the output from the NOT gate 3053 and performs an AND operation of the first equivalence control single eq1 and the output signal, and outputs the operational result to the OR gate 3055.

The OR gate 3055 receives the MSB of the subtraction result data Dsub and the output from the AND gate 3054, performs an OR operation of the MSB and the output signal, and outputs the operational result to the XOR gate 3056.

The XOR gate 3056 receives the control signal cctl1 (cctl in FIG. 4) from the control signal generation unit 303 and the output from the OR gate 3055 and performs an XOR operation of the control signal cctl1 and the output signal, and outputs the operational result to the NOT gate 3057.

The NOT gate 3057 receives the output from the XOR gate 3056 and performs a NOT operation using the received data, and outputs the operational result to the AND gate 3059.

The OR gate 3058 receives the determination result signal non_zero_det output from the non-zero determiner 3052 and the control signal eq1 for controlling the equivalence condition output from the instruction control unit 1. The control signal is hereafter referred to as the first equivalence control signal. The OR gate 3058 performs an OR operation of the two input signals, and outputs the operational result to the AND gate 3059.

The AND gate 3059 receives the output from the NOT gate 3057 and the output from the OR gate 3058 and performs an AND operation of the two input signals, and outputs the operational result to the concatenation unit 307 as output data D1.

The second comparator 306 has the same configuration as the first comparator 305. In the second comparator 306, the control signal cctl shown in FIG. 4 is the control signal cctl2 output from the control signal generation unit 303. The control signal eq shown in FIG. 4 is the control signal eq2 output from the instruction control unit 1 for controlling the equivalence condition (the control signal is hereafter referred to as the second equivalence control signal). The second comparator 306 outputs its comparison result to the concatenation unit 307 as output data D2. The input data Din1 shown in FIG. 4 is the data src output from the register file unit 2. The input data Din2 shown in FIG. 4 is the second register value val2 output from the second register 302.

As shown in FIG. 5, the concatenation unit 307 includes an AND gate 3071, an OR gate 3072, and a selector 3073.

The AND gate 3071 receives the output data D1 from the first comparator 305 and the output data D2 from the second comparator 306 and performs an AND operation of the two sets of input data, and outputs the operational result to the selector 3073.

The OR gate 3072 receives the output data D1 from the first comparator 305 and the output data D2 from the second comparator 306 and performs an OR operation of the two sets of input data, and outputs the operational result to the selector 3073.

The selector 3073 receives the data sets output from the AND gate 3071 and the OR gate 3072. The selector 3073 also receives the control signal bctl output from the control signal generation unit 303. The selector 3073 selects one of the two received data sets in accordance with the signal value of the control signal bctl, and outputs the selected data to the conditional register unit 4 as a condition flag CF.

The conditional register unit 4 receives the condition flag CF output from the instruction execution unit 3. The conditional register unit 4 includes a register for storing the input condition flag CF. The conditional register unit 4 generates a control signal CFctl for controlling the instruction execution unit 3 to perform predetermined processing in accordance with the value of the condition flag CF, and outputs the generated control signal CFctl to the instruction execution unit 3. In the example of FIG. 1, the conditional register unit 4 receives a condition flag CF output from the range determination arithmetic unit S14 in the instruction execution unit 3, and stores the flag into a predetermined register. The conditional register unit 4 generates a control signal CFctl in accordance with the value of the condition flag CF, and outputs the generated control signal CFctl to, for example, the conditional adder unit S21 in the instruction execution unit 3.

The instruction memory M1 stores instructions and/or data to be fetched by the instruction control unit 1. The instruction memory M1 is accessible by the instruction control unit 1.

The data memory M2 stores data to be loaded and stored by the instruction execution unit 3. The data memory M2 is accessible by the load-store unit S31 included in the third slot S3 in the instruction execution unit 3.

1.2 Operation of SIMD Processor

The operation of the SIMD processor 1000 with the above configuration will now be described with reference to the drawings.

The operation of the SIMD processor 1000 described below includes processing performed using range determination including (1) calculating Histograms of Oriented Gradients (HOG) and (2) particle filtering.

1.2.1 Calculating Histograms

The HOG calculation performed by the SIMD processor 1000 will now be described.

This processing is implemented with procedures 1 to 4 below.

Procedure 1:

The SIMD processor 1000 first sets a rectangular image area of N×M pixels (N and M are natural numbers) as a target area for HOG calculation. The SIMD processor 1000 then calculates the gradient vector angle, gradient (x, y), for each pixel in the image area. The gradient vector angle, gradient (x, y), is calculated through steps (1) and (2) described below when (x, y) represents the coordinates of a processing target pixel and I(x, y) represents the pixel value of the target pixel.

(1) For each pixel (target pixel) included in a processing target image area, the gradient intensity dx(x, y) in X-direction between the target pixel and its adjacent pixels to the right and the left is calculated using the formula below.

$$dx(x,y)=I(x+1,y)-I(x-1,y)$$

The gradient intensity dy(x, y) in Y-direction between the target pixel and its adjacent pixels above and below is calculated using the formula below.

$$dy(x,y)=I(x,y+1)-I(x,y-1)$$

(2) The gradient vector angle of the target pixel, or the gradient (x, y), is calculated using the formula below using the value obtained by dividing the X-direction gradient intensity dy(x, y) by the Y-direction gradient intensity dx(x, y), $$gradient(x,y)=\operatorname{atan}(dy(x,y)/dx(x,y))$$

where atan( ) is an inverse tangent (arctangent) function.

The calculated gradient vector angles gradient (x, y) may be stored in consecutive memory areas of the data memory M2.

Procedure 2:

The SIMD processor 1000 determines the boundary values defining the range of each bin of the HOG The determined boundary values may be stored in consecutive memory areas of the data memory M2.

Procedure 3:

The SIMD processor 1000 allocates an area in the register file unit 2 for storing the histogram value of each bin of the HOG (the count value or the cumulative total value, which is incremented when the processing target data falls within each bin) (or may allocate a register included in the register file unit 2 for storing the histogram value of each bin). The SIMD processor 1000 then initializes the histogram value of each bin to 0.

Procedure 4:

The SIMD processor 1000 executes instructions to generate a HOG FIG. 6 shows an example execution schedule of instructions to generate a HOG More specifically, FIG. 6 shows (1) operations allocated to slots 1 to 3 in each cycle in the left portion, and (2) the first register value val1, the second register value val2, and the data src input from the register file unit 2 into the range determination arithmetic unit S14 in each cycle in its right portion.

An execution schedule of instructions to generate the HOG will now be described with reference to FIG. 6. For ease of explanation, the histogram includes four bins.

Cyc0:

In cycle 0, the load-store unit S31 in the third slot loads the gradient vector angle grad1. The loaded gradient vector angle grad1 is output to the register file unit 2 through a data path Do3 as shown in FIG. 1. The register file unit 2 stores the gradient vector angle grad1 output from the third slot S3 into a predetermined register.

Cyc1:

In cycle 1, the instruction control unit 1 provides a data write instruction (Write instruction) to the instruction execution unit 3. The data writing arithmetic unit S13 in the first slot S1 of the instruction execution unit 3 writes data in accordance with the data write instruction (Write instruction). More specifically, the data writing arithmetic unit S13 receives the gradient vector angle grad1 loaded in cycle 0 and a histogram lower limit histL1 from the register file unit 2 through data paths Di11 and Di12, and writes the two input data sets. The data writing arithmetic unit S13 sets the first and second register values in the manner described below.

First register value val1=histL1
Second register value val2=grad1

The lower limit histL1 of the histogram is stored in a predetermined register included in the register file unit 2.

The load-store unit S31 in the third slot loads the next boundary value histL2 for the HOG from the data memory M2. The loaded next boundary value histL2 of the HOG is then output to the register file unit 2 through the data path Do3.

Cyc2:

In cycle 2, the instruction control unit 1 provides a range determination instruction (RngD) to the instruction execution unit 3. The range determination arithmetic unit S14 in the first slot S1 of the instruction execution unit 3 performs range determination in accordance with the range determination instruction (RngD). More specifically, the range determination arithmetic unit S14 receives the histogram boundary value histL2, which is loaded in cycle 1, as the data src from the register file unit 2.

In the HOG calculation performed by the SIMD processor 1000, the instruction control unit 1 sets the control signal range to 0. The selector 304 thus outputs the input from the second register 302 to the first comparator 305 as shown in FIG. 2.

The control signal range is 0. This control signal sets the control signals cctl1 and cctl2 generated by the control signal generation unit 303 to 0.

The operation of the first comparator 305 (the operation in cycle 2) will now be described.

The signals below are input into the first comparator 305. The signal value of the first equivalence control signal eq1 is set to 0.

cctl1=0
Din1=val2=grad1
Din2=val1=histL1
src=histL2
eq1=0

(1) When the signals cctl1, Din1, Din2, src, and eq1 are set as described above and Din2<Din1, or in other words, histL1<grad1, Dsub=Din1−Din2>0,
MSB=0, and
non_zero_det=1.

The resultant data D1 output from the AND gate 3059 indicates 1.

(2) When the signals cctl1, Din1, Din2, src, and eq1 are set as described above and Din2>Din1, or in other words, histL1>grad1, Dsub=Din1−Din2<0,
MSB=1, and
non_zero_det=1.

The resultant data D1 output from the AND gate 3059 indicates 0.

(3) When the signals cctl1, Din1, Din2, src, and eq1 are set as described above and Din2=Din1, or in other words, histL1=grad1, Dsub=Din1−Din2=0,
MSB=0, and
non_zero_det=0.

The resultant data D1 output from the AND gate 3059 indicates 0.

In this case (3), the signal eq1 set at 1 allows the output from the OR gate 3058 to indicate 1, and the output from the AND gate 3059 to indicate 1. As a result, the output data D1 indicates 1.

As described above, the signals are input in the manner described below.

cctl1=0
Din1=val2=grad1
Din2=val1=histL1
src=histL2
eq1=0

In this case, when Din2<Din1, or in other words, histL1<grad1, the output data D1 from the first comparator 305 indicates 1. In any other cases, the output data from the first comparator 305 indicates 0.

The signal eq1 set at 1 allows the output data D1 from the first comparator 305 to indicate 1 when Din2≤Din1, or in other words, histL1≤grad1. In any other cases, the output data D1 from the first comparator 305 indicates 0.

The operation of the second comparator 306 (the operation in cycle 2) will now be described.

The signals below are input into the second comparator 306. The signal value of the second equivalence control signal eq2 is set at 0.

cctl2=0
Din1=src=histL2
Din2=val2=grad1
eq2=0

(1) When the signals cctl2, Din1, Din2, and eq2 are set as described above and Din2<Din1, or in other words, grad1<histL2, Dsub=Din1−Din2>0,
MSB=0, and
non_zero_det=1.

The resultant data D2 output from the AND gate 3059 (the output data D2 of the second comparator 306) indicates 1.

(2) When the signals cctl2, Din1, Din2, and eq2 are set as described above and Din2>Din1, or in other words, grad1>histL2, Dsub=Din1−Din2<0,
MSB=1, and
non_zero_det=1.

The resultant data D2 output from the AND gate 3059 (the output data D2 of the second comparator 306) indicates 0.

(3) When the signals cctl2, Din1, Din2, and eq2 are set as described above and Din2=Din1, or in other words, grad1=histL2, Dsub=Din1−Din2=0,
MSB=0, and
non_zero_det=0

The resultant data D1 output from the AND gate 3059 indicates 0.

In this case (3), the signal eq2 set at 1 allows the output from the OR gate 3058 to indicate 1, and the output from the AND gate 3059 to indicate 1. In other words, the output data D2 from the second comparator 306 indicates 1.

As described above, the signals are input in the manner described below.

cctl2=0
Din1=src=histL2
Din2=val2=grad1
eq2=0

In this case, when Din2<Din1, or in other words, grad1<histL2, the output data D2 from the second comparator 306 indicates 1. In any other cases, the output data D2 from the second comparator 306 indicates 0.

The signal eq2 set at 1 allows the output data D2 from the second comparator 306 to indicate 1 when Din2≤Din1, or in other words, grad1≤histL2. In any other cases, the output data D2 from the second comparator 306 indicates 0.

The operation of the concatenation unit 307 (the operation in cycle 2) will now be described.

When the control signal range is 0, the signal value of the control signal bctl output from the control signal generation unit 303 is 0. The selector 3073 thus selectively outputs the data from the AND gate 3071. The concatenation unit 307 outputs the result of an AND operation of the output data D1 from the first comparator 305 and the output data D2 from the second comparator 306 to the conditional register unit 4 as a condition flag CF.

In cycle 2, the range determination arithmetic unit S14 sets the condition flag CF in the manner described below and outputs the flag to the conditional register unit 4.

(1) In a case where the signal eq1 is 0 and the signal eq2 is 0,
  (1A) the flag CF is set to 1 when histL1<grad1<histL2, and
  (1B) the flag CF is set to 0 in any other cases.
(2) In a case where the signal eq1 is 1 and the signal eq2 is 0,
  (2A) the flag CF is set to 1 when histL1≤grad1<histL2, and
  (2B) the flag CF is set to 0 in any other cases.
(3) In a case where the signal eq1 is 0 and the signal eq2 is 1,
  (3A) the flag CF is set to 1 when histL1<grad1≤histL2, and
  (3B) the flag CF is set to 0 in any other cases.
(4) In a case where the signal eq1 is 1 and the signal eq2 is 1,
  (4A) the flag CF is set to 1 when histL1≤grad1≤histL2, and
  (4B) the flag CF is set to 0 in any other cases.

In cycle 2, the range determination arithmetic unit S14 determines whether the value grad1 set in the second register (=val2) falls within a range defined by the boundary values histL1 and histL2. The range determination arithmetic unit S14 outputs a condition flag CF indicating the determination result to the conditional register unit 4.

In cycle 2, the load-store unit S31 in the third slot loads the next boundary value histL3 of the HOG from the data memory M2. The next boundary value histL3 of the HOG is then output to the register file unit 2 through the data path Do3.

Cyc3:

In cycle 3, the instruction control unit 1 provides a conditional addition instruction (Addt instruction) to the instruction execution unit 3. The conditional adder unit S21 in the second slot S2 of the instruction execution unit 3 performs conditional addition in accordance with the conditional addition instruction (Addt instruction). More specifically, the conditional adder unit S21 receives the histogram value hist_bin1 of a first bin (a bin defined by the histogram lower limit histL1 and the boundary value histL2) from the register file unit 2, and performs conditional addition using the histogram value hist_bin1 in accordance with the control signal CFctl output from the conditional register unit 4.

In cycle 2, the flag CF is set to 1 when the range determination arithmetic unit S14 determines that the gradient vector angle grad1 of the processing target pixel falls within the first bin (within the range defined by the histogram lower limit histL1 and the boundary value histL2). The conditional register unit 4 sets the signal value of the control signal CFctl to 1 based on the value of the condition flag CF. The conditional register unit 4 outputs the signal to the conditional adder unit S21. The conditional adder unit S21 then increments the histogram value hist_bin1 of the first bin by one, because the control signal CFctl is set at 1. In other words, the conditional adder unit S21 generates a value by adding one to the histogram value hist_bin1 of the first bin, and outputs the generated value to the register file unit 2 through a data path Do2. The register file unit 2 stores the value resulting from the conditional addition performed by the conditional adder unit S21 into a predetermined register as the histogram value hist_bin1 of the first bin.

When the range determination arithmetic unit S14 determines that the gradient vector angle grad1 of the processing target pixel is not a value within the first bin (a value within the range defined by the histogram lower limit histL1 and the boundary value histL2) in cycle 2, the flag CF is set to 0. The conditional register unit 4 sets the signal value of the control signal CFctl to 0 in accordance with the value of the condition flag CF, and outputs the signal to the conditional adder unit S21. The conditional adder unit S21 does not perform addition for the histogram value hist_bin1 of the first bin, because the signal value of the control signal CFctl is 0. In this case, the histogram value hist_bin1 of the first bin stored in the register file unit 2 is not updated, and retained.

In cycle 3, the range determination arithmetic unit S14 performs the same processing as described for cycle 2 under the conditions below.

val1=histL2
val2=grad1
src=histL3

In cycle 3, the range determination arithmetic unit S14 sets the condition flag CF in the manner described below and outputs the flag to the conditional register unit 4.

(1) In a case where the signal eq1 is 0 and the signal eq2 is 0,
  (1A) the flag CF is set to 1 when histL2<grad1<histL3, and
  (1B) the flag CF is set to 0 in any other cases.
(2) In a case where the signal eq1 is 1 and the signal eq2 is 0,
  (2A) the flag CF is set to 1 when histL2≤grad1<histL3, and
  (2B) the flag CF is set to 0 in any other cases.
(3) In a case where the signal eq1 is 0 and the signal eq2 is 1,
  (3A) the flag CF is set to 1 when histL2<grad1≤histL3, and
  (3B) the flag CF is set to 0 in any other cases.
(4) In a case where the signal eq1 is 1 and the signal eq2 is 1,
  (4A) the flag CF is set to 1 when histL2≤grad1≤histL3, and
  (4B) the flag CF is set to 0 in any other cases.

In cycle 3, the range determination arithmetic unit S14 determines whether the value grad1 set in the second register (=val2) falls within the range defined by the boundary values histL2 and histL3. The range determination arithmetic unit S14 outputs a condition flag CF indicating the determination result to the conditional register unit 4.

When the signal value of the control signal range is 0, the first register 301 updates the first register value val1 to allow the value src (=histL2) input from the register file unit 2 in cycle 2 to be output to the first comparator 305 as the first register value val1 in cycle 3.

In cycle 3, the load-store unit S31 in the third slot loads the next boundary value histL4 of the HOG from the data memory M2. The loaded next boundary value histL4 of the HOG is output to the register file unit 2 through the data path Do3.

Cyc4:

In cycle 4, the instruction control unit 1 provides a conditional addition instruction (Addt instruction) to the instruction execution unit 3. The conditional adder unit S21 in the second slot S2 of the instruction execution unit 3 performs conditional addition in accordance with the conditional addition instruction (Addt instruction). More specifically, the conditional adder unit S21 receives the histogram value hist_bin2 of a second bin (a bin defined by the histogram boundary values histL2 and histL3) from the register file unit 2, and performs conditional addition using the histogram value hist_bin2 in accordance with the control signal CFctl output from the conditional register unit 4.

When the range determination arithmetic unit S14 determines that the gradient vector angle grad1 of the processing target pixel falls within the second bin in cycle 3 (within the range defined by the histogram boundary values histL2 and histL3), the flag CF is set to 1. The conditional register unit 4 sets the signal value of the control signal CFctl to 1 in accordance with the value of the condition flag CF. The conditional register unit 4 outputs the signal to the conditional adder unit S21. The conditional adder unit S21 then increments the histogram value hist_bin2 of the second bin by one, because the signal value of the control signal CFctl is 1. The conditional adder unit S21 generates a value by adding one to the histogram value hist_bin2, and outputs the generated value to the register file unit 2 through the data path Do2. The register file unit 2 stores the value resulting from the conditional addition performed by the conditional adder unit S21 into a predetermined register as the histogram value hist_bin2.

When the range determination arithmetic unit S14 determines that the gradient vector angle grad1 of the processing target pixel is not a value within the second bin (a value within the range defined by the histogram boundary value histL2 and the boundary value histL3) in cycle 3, the flag CF is set to 0.

The conditional register unit 4 sets the signal value of the control signal CFctl to 0 in accordance with the value of the condition flag CF, and outputs the signal to the conditional adder unit S21. The conditional adder unit S21 does not increment the histogram value hist_bin2 of the second bin, because the signal value of the control signal CFctl is 0. In this case, the histogram value hist_bin2 stored in the register file unit 2 is not updated, and is retained.

In cycle 4, the range determination arithmetic unit S14 performs the same processing as described for cycle 2 under the conditions below.

val1=histL3,
val2=grad1, and
src=histL4.

In cycle 4, the range determination arithmetic unit S14 sets the condition flag CF in the manner described below and outputs the flag to the conditional register unit 4.

(1) In a case where the signal eq1 is 0 and the signal eq2 is 0,
  (1A) the flag CF is set to 1 when histL3<grad1<histL4, and
  (1B) the flag is set to 0 in any other cases.
(2) In a case where the signal eq1 is 1 and the signal eq2 is 0,
  (2A) the flag is set to 1 when histL3≤grad1<histL4, and
  (2B) the flag is set to 0 in any other cases.
(3) In a case where the signal eq1 is 0 and the signal eq2 is 1,
  (3A) the flag CF is set to 1 when histL3<grad1≤histL4, and
  (3B) the flag is set to 0 in any other cases.
(4) In a case where the signal eq1 is 1 and the signal eq2 is 1,
  (4A) the flag CF is set to 1 when histL3≤grad1≤histL4, and
  (4B) the flag is set to 0 in any other cases.

In cycle 4, the range determination arithmetic unit S14 determines whether the value grad1 (=val2) stored in the second register falls within the range defined by the boundary values histL3 and histL4, and then outputs a condition flag CF indicating the determination result to the conditional register unit 4.

The first register 301 updates the first register value val1 to allow the src value (histL3) received from the register file unit 2 in cycle 3 to be output to the first comparator 305 as the first register value val1 in cycle 4.

In cycle 4, the load-store unit S31 in the third slot loads the next boundary value histL5 of the HOG from the data memory M2. The next boundary value histL5 of the HOG is then output to the register file unit 2 through the data path Do3.

Cyc5:

In cycle 5, the instruction control unit 1 provides a conditional addition instruction (Addt instruction) to the instruction execution unit 3. The conditional adder unit S21 in the second slot S2 of the instruction execution unit 3 performs conditional addition in accordance with the conditional addition instruction (Addt instruction). More specifically, the conditional adder unit S21 receives the histogram value hist_bin3 of a third bin, which is defined by the histogram boundary values histL3 and histL4, from the register file unit 2, and performs conditional addition using the histogram value hist_bin3 in accordance with the control signal CFctl output from the conditional register unit 4.

In cycle 4, the range determination arithmetic unit S14 determines that the gradient vector angle grad1 of the processing target pixel falls within the third bin (within the range defined by the histogram boundary values histL3 and histL4), the flag CF is set to 1. The conditional register unit 4 sets the signal value of the control signal CFctl to 1 in accordance with the value of the condition flag CF, and outputs the signal to the conditional adder unit S21. The conditional adder unit S21 then increments the histogram value hist_bin3 by one, because the signal value of the control signal CFctl is 1. The conditional adder unit S21 generates a value by adding one to the histogram value hist_bin3, and outputs the generated value to the register file unit 2 through the data path Do2. The register file unit 2 stores the value resulting from the conditional addition performed by the conditional adder unit S21 into a predetermined register as the histogram value hist_bin3.

When the range determination arithmetic unit S14 determines that the gradient vector angle grad1 of the processing target pixel is not a value within the third bin (a value within the range defined by the histogram boundary value histL3 and the boundary value histL4) in cycle 4, the flag CF is set to 0. The conditional register unit 4 sets the signal value of the control signal CFctl to 0 in accordance with the value of the condition flag CF, and outputs the signal to the conditional adder unit S21. The conditional adder unit S21 does not increment the histogram value hist_bin3 of the third bin, because the signal value of the control signal CFctl is 0. In this case, the histogram value hist_bin3 stored in the register file unit 2 is not updated, and is retained.

The range determination arithmetic unit S14 in cycle 5 performs the same processing as described for cycle 2 under the conditions below.

val1=histL4,
val2=grad1, and
src=histL5.

In cycle 5, the range determination arithmetic unit S14 sets the condition flag CF in the manner described below and outputs the flag to the conditional register unit 4.

(1) In a case where the signal eq1 is 0 and the signal eq2 is 0,
  (1A) the flag CF is set to 1 when histL4<grad1<histL5, and
  (1B) the flag is set to 0 in any other cases.
(2) In a case where the signal eq1 is 1 and the signal eq2 is 0,
  (2A) the flag CF is set to 1 when histL4≤grad1<histL5, and
  (2B) the flag is set to 0 in any other cases.
(3) In a case where the signal eq1 is 0 and the signal eq2 is 1,
  (3A) the flag CF is set to 1 when histL4<grad1≤histL5, and
  (3B) the flag is set to 0 in any other cases.
(4) In a case where the signal eq1 is 1 and the signal eq2 is 1,
  (4A) the flag CF is set to 1 when histL4≤grad1≤histL5, and
  (4B) the flag is set to 0 in any other cases.

In cycle 5, the range determination arithmetic unit S14 determines whether the value grad1 (=val2) stored in the second register falls within the range defined by the boundary values histL4 and histL5, and then outputs a condition flag CF indicating the determination result to the conditional register unit 4.

The first register 301 updates the first register value val1 to allow the value src (=histL4) received from the register file unit 2 in cycle 4 to be output to the first comparator 305 as the first register value val1 in cycle 5.

In cycle 5, the load-store unit S31 in the third slot loads a gradient vector angle grad2, which is then output to the register file unit 2 through the data path Do3. The register file unit 2 stores the gradient vector angle grad2 output from the third slot S3 into a predetermined register.

Cyc6:

In cycle 6, the instruction control unit 1 provides a data write instruction (Write instruction) to the instruction execution unit 3. The data writing arithmetic unit S13 in the first slot S1 of the instruction execution unit 3 writes data in accordance with the data write instruction (Write instruction). More specifically, the data writing arithmetic unit S13 receives the gradient vector angle grad2 loaded in cycle 5 and the histogram lower limit histL1 from the register file unit 2 through the data paths Dil1 and Dil2, and writes the two received data sets. In other words, the data writing arithmetic unit S13 sets the first and second register values in the manner described below.

First register value val1=histL1
Second register value val2=grad2

The load-store unit S31 in the third slot loads the next boundary value histL2 of the HOG from the data memory M2. The next boundary value histL2 of the HOG is then output to the register file unit 2 through the data path Do3.

In cycle 6, the instruction control unit 1 provides a conditional addition instruction (Addt instruction) to the instruction execution unit 3. The conditional adder unit S21 in the second slot S2 of the instruction execution unit 3 performs conditional addition in accordance with the conditional addition instruction (Addt instruction). More specifically, the conditional adder unit S21 receives the histogram value hist_bin4 of a fourth bin, which is defined by the histogram boundary value histL4 and the boundary value histL5, from the register file unit 2, and performs conditional addition using the histogram value hist_bin4 in accordance with the control signal CFctl output from the conditional register unit 4.

When the range determination arithmetic unit S14 in cycle 5 determines that the gradient vector angle grad1 of the processing target pixel falls within the fourth bin (within the range defined by the histogram boundary values histL4 and histL5), the flag CF is set to 1. The conditional register unit 4 sets the signal value of the control signal CFctl to 1 in accordance with the value of the condition flag CF, and outputs the signal to the conditional adder unit S21. The conditional adder unit S21 then increments the histogram value hist_bin4 by one, because the signal value of the control signal CFctl is 1. The conditional adder unit S21 generates a value by adding one to the histogram value hist_bin4, and outputs the generated value to the register file unit 2 through the data path Dot. The register file unit 2 stores the value resulting from the conditional addition performed by the conditional adder unit S21 into a predetermined register as the histogram value hist_bin4.

When the range determination arithmetic unit S14 determines that the gradient vector angle grad1 of the processing target pixel is not a value within the fourth bin (a value within the range defined by the histogram boundary value histL4 and the boundary value histL5) in cycle 5, the flag CF is set to 0. The conditional register unit 4 sets the signal value of the control signal CFctl to 0 in accordance with the value of the condition flag CF, and outputs the signal to the conditional adder unit S21. The conditional adder unit S21 does not increment the histogram value hist_bin4 of the fourth bin, because the signal value of the control signal CFctl is 0. In this case, the histogram value hist_bin4 stored in the register file unit 2 is not updated, and is retained.

Cyc7 and Subsequent Cycles:

In Cycles 7 to 11, the same processing as described for cycles 2 to 6 is performed. Such processing enables determination as to which one of the bins 1 to 4 includes the gradient vector angle grad2 of the target pixel in the histogram calculation process.

The above processing is repeated to implement the histogram calculation process for a plurality of data sets (gradient vector angles).

Through the processing described above, the SIMD processor 1000 implements the HOG calculation.

1.2.2 Particle Filtering

A particle filtering process performed by the SIMD processor 1000 will now be described.

Particle filtering is a technique for Bayesian modeling that approximates a conditional distribution using many instances. Particle filtering is used for example in image recognition.

The particle filtering process will now be described with reference to FIG. 7.

FIG. 7 is a diagram describing the particle filtering process. FIG. 7 schematically shows, on the same horizontal axis (X-axis), (1) the prior probability distribution of particles, (2) actual observation at time t, (3) the likelihood at time t, (4) the posterior probability distribution of particles at time t, (5) the prior probability distribution of particles at the next timestep (time t+1), (6) actual observation at time t+1, and (7) the likelihood at time t+1. Although image recognition using particle filtering involves two-dimensional processing, the processing shown in FIG. 7 is one dimensional (particle filtering using one-dimensional data) for ease of explanation.

An image recognition process for detecting a yellow object in an image using particle filtering will now be described. This process includes steps (1) to (7) below.

(1) At time t, particles are arranged randomly, and the prior probability distribution of the particles is obtained.

(2) At time t, actual observation data is obtained. In other words, the yellow level of each data portion of the image is determined. Data indicating the yellow level corresponds to the actual observation data (actual observation) at time t as shown in the portion (2) of FIG. 7.

(3) The likelihood is calculated for each of the particles arranged in the prior probability distribution at time t. The likelihood for each particle is indicted by a dot in the portion (3) of FIG. 7. A larger dot indicates a greater likelihood.

(4) The posterior probability distribution of particles is determined depending on the calculated likelihoods. As shown in the portion (4) of FIG. 7, the posterior probability distribution is determined to arrange more particles in areas with greater likelihoods.

(5) The prior probability distribution of particles at the next timestep (time t+1) is obtained. The prior probability distribution is determined to arrange particles at positions calculated by adding or subtracting random numbers to or from the particle positions in the posterior probability distribution.

(6) At time t+1, the actual observation data is obtained. More specifically, the yellow level is determined for each data portion of the image. Data indicating this yellow level is the actual observation data (actual observation) at time t+1 shown in the portion (6) of FIG. 7.

(7) The likelihood is calculated for each of the particles arranged in the posterior probability distribution at time t+1.

Through this processing, more particles are arranged in an area with a higher yellow level. Detecting an area containing many particles thus enables detecting a yellow object in an image in image recognition.

To obtain the prior probability distribution of particles at the next timestep, the particles need to be located (rearranged) using random numbers. Some particles may be located outside the image area. Such particles need exceptional processing.

When, for example, the maximum value for particles in X-axis direction (horizontal axis direction) corresponds to the position indicated by the maximum Xmax in FIG. 7, the particle p1 shown in FIG. 7 is outside the range of possible values of particles. More specifically, the position corresponding to the particle p1 is determined as the position for rearrangement in calculating the prior probability distribution at the next timestep (time t+1). However, when the position for rearrangement fails to fall within the range of possible values of particles, this particle needs exception processing.

Particle filtering involves much processing for each individual particle, and thus improves its efficiency by using parallel processing. A SIMD processor is thus suited to particle filtering. Improving the efficiency of exception processing described above would increase the processing efficiency.

The SIMD processor 1000 with the configuration shown in FIG. 1 efficiently performs the above exception processing in particle filtering, and thus improves the efficiency of the particle filtering process. This will be described in detail below.

The SIMD processor 1000 performs the particle filtering process with procedures 1 to 3 described below.

Procedure 1:

The SIMD processor 1000 may store the X position (X-coordinate) and the Y position (Y-coordinate) of each particle included in an image into different continuous memory spaces of the data memory M2.

Procedure 2:

The instruction control unit 1 provides a data write instruction (Write instruction) to the instruction execution unit 3. The data writing arithmetic unit S13 in the first slot S1 of the instruction execution unit 3 performs a data writing process in accordance with the data write instruction. More specifically, the data writing arithmetic unit S13 receives the highest and lowest possible values of particles from the register file unit 2 through the data paths Di11 and Di12, and writes these values in the first and second registers 301 and 302. For example, when Xmax indicates a maximum value for particles in X-axis direction and Xmin is a minimum value for particles in X-axis direction, the data writing arithmetic unit S13 sets the first register value and the second register value in the manner described below.

First register value val1=Xmin

Second register value val2=Xmax

For ease of explanation, the processing for particle positions in X-axis direction will now be described.

Procedure 3:

FIG. 8 shows an execution schedule of instructions for changing the positions of (or rearranging) particles.

Cyc0:

In cycle 0, the instruction control unit 1 provides a load instruction (Load instruction) and a random-number generation instruction (Rand instruction) to the instruction execution unit 3. The load-store unit S31 in the third slot S3 loads positional information (X-coordinate position) x1 of a first particle, and outputs the loaded information about the X-coordinate position x1 to the register file unit 2 through the data path Do3. The register file unit stores the received information about the coordinate position x1 into a predetermined register. The random-number generating unit S22 in the second slot S2 generates a variation $\Delta x1$ ($\Delta x1$ is a real number) to be added to the positional information x1, and outputs the generated variation $\Delta x1$ to the register file unit 2 through the data path Do2. The register file unit 2 stores the variation $\Delta x1$ into a predetermined register.

Cyc1:

In cycle 1, the instruction control unit 1 provides an addition instruction (Add) to the instruction execution unit 3. The adder unit S11 in the first slot S1 of the instruction execution unit 3 adds up the positional information x1 of the first particle and its variation $\Delta x1$, both of which are generated in cycle 0 in accordance with the addition instruction (Add). The adder unit S11 outputs the addition result x1+$\Delta x1$ to the register file unit 2 through a data path Do1.

Cyc2:

In cycle 2, the instruction control unit 1 provides a range determination instruction (RngD) to the instruction execution unit 3. The range determination arithmetic unit S14 in the first slot S1 of the instruction execution unit 3 performs range determination in accordance with the range determination instruction (RngD). More specifically, the range determination arithmetic unit S14 receives the addition result $x1+\Delta x1$ generated in cycle 1 from the register file unit 2, and performs the range determination using the addition result $x1+\Delta x1$.

In the particle filtering process performed by the SIMD processor 1000, the instruction control unit 1 sets the control signal range to 1. The selector 304 thus outputs the data src received from the register file unit 2 to the first comparator 305 as shown in FIG. 2.

Also, the control signal range is set at 1. The range direction setting signal dir is set at 0. The signal value of the control signal cctl1 generated by the control signal generation unit 303 is set to 0. The signal value of the control signal cctl2 is set to 1.

The operation of the first comparator 305 (the operation in cycle 2) will now be described.

The signals below are input into the first comparator 305. The signal value of the first equivalence control signal eq1 is set at 0.

cctl1=1
Din1=src=$x1+\Delta x1$
Din2=val1=Xmin
eq1=0

(1) When the signals cctl1, Din1, Din2, and eq1 are set as described above and Din2<Din1, or in other words, Xmin<$x1+\Delta x1$, Dsub=Din1−Din2>0,
MSB=0, and
non_zero_det=1.

The resultant data D1 output from the AND gate 3059 indicates 1.

(2) When the signals cctl1, Din1, Din2, and eq1 are set as described above and Din2>Din1, or in other words, Xmin>$x1+\Delta x1$, Dsub=Din1−Din2<0,
MSB=1, and
non_zero_det=1.

The resultant data D1 output from the AND gate 3059 indicates 0.

(3) When the signals cctl1, Din1, Din2, and eq1 are set as described above and Din2=Din1, or in other words, Xmin=$x1+\Delta x1$, Dsub=Din1−Din2=0,
MSB=0, and
non_zero_det=0.

The resultant data D1 output from the AND gate 3059 indicates 0.

In this case (3), the signal eq1 set at 1 allows the output from the OR gate 3058 to indicate 1 and the output from the AND gate 3059 to indicate 1. As a result, the output data D1 indicates 1.

As described above, the signals are input in the manner described below.

cctl1=1
Din1=src=$x1+\Delta x1$
Din1=val1=Xmin
eq1=0.

In this case, when Din2<Din1, or in other words, Xmin<$x1+\Delta x1$, the output data D1 from the first comparator 305 indicates 1. In any other cases, the output data from the first comparator 305 indicates 0.

For the signal eq1 at 1, the output data D1 from the first comparator 305 indicates 1 when Din2≤Din1, or in other words, Xmin≤$x1+\Delta x1$. In any other cases, the output data from the first comparator 305 indicates 0.

The operation of the second comparator 306 (the operation in cycle 2) will now be described.

The signals below are input into the second comparator 306. The signal value of the second equivalence control signal eq2 is set at 0, cctl2=1
Din1=src=$x1+\Delta x1$
Din2=val2=Xmax
eq2=0

(1) When the signals cctl2, Din1, Din2, and eq2 are set as described above and Din2<Din1, or in other words, Xmax<$x1+\Delta x1$, Dsub=Din1−Din2>0,
MSB=0,
cctl2=1, and
non_zero_det=1.

In this case, the output data D2 from the AND gate 3059 (the output data D2 of the second comparator 306) indicates 0.

(2) When the signals cctl2, Din1, Din2, and eq2 are set as described above and Din2>Din1, or in other words, Xmax>$x1+\Delta x1$, Dsub=Din1−Din2<0,
MSB=1,
cctl2=1, and
non_zero_det=1.

In this case, the output data D2 from the AND gate 3059 (the output data D2 of the second comparator 306) indicates 1.

(3) When the signals cctl2, Din1, Din2, and eq2 are set as described above and Din2=Din1, or in other words, Xmax=$x1+\Delta x1$, Dsub=Din1−Din2=0,
MSB=0,
cctl2=1, and
non_zero_det=0.

In this case, the output data D1 from the AND gate 3059 indicates 0.

In this case (3), the signal eq2 set at 1 allows the output from the OR gate 3058 to indicate 1 and the output from the NOT gate 3057 to indicate 1, and thus the output from the AND gate 3054 to indicate 1, the output from the XOR gate 3056 to indicate 0, the output from the NOT gate 3057 to indicate 1, and the output from the AND gate 3059 to indicate 1. As a result, the output data D2 from the second comparator 306 indicates 1.

As described above, the signals are input in the manner described below.

cctl2=1
Din1=src=$x1+\Delta x1$
Din1=val2=Xmax
eq2=0

In this case, when Din1<Din2, or in other words, $x1+\Delta x1$<Xmax, the output data D2 from the second comparator 306 indicates 1. In any other cases, the output data D2 from the second comparator 306 indicates 0.

For the signal eq2 at 1, the output data D2 from the second comparator 306 is 1 when Din1≤Din2, or in other words, $x1+\Delta x1$≤Xmax. In any other cases, the output data D2 from the second comparator 306 indicates 0.

The operation of the concatenation unit 307 (the operation in cycle 2) will now be described.

The control signal range is set at 1 and the range direction setting signal dir is set at 0. In this case, the signal value of the control signal bctl from the control signal generation unit 303 is 0. The selector 3073 thus selectively outputs the data from the AND gate 3071. More specifically, the concatenation unit 307 outputs the result of an AND operation of the output data D1 from the first comparator 305 and the output data D2 from the second comparator 306 to the conditional register unit 4 as a condition flag CF.

In cycle 2, the range determination arithmetic unit S14 sets the condition flag CF in the manner described below and outputs the flag to the conditional register unit 4.

(1) In a case where the signal eq1 is 0 and the signal eq2 is 0,
(1A) the flag CF is set to 1 when Xmin<x1<Xmax, and
(1B) the flag is set to 0 in any other cases.
(2) In a case where the signal eq1 is 1 and the signal eq2 is 0,
(2A) the flag CF is set to 1 when Xmin≤x1<Xmax,
(2B) the flag is set to 0 in any other cases.
(3) In a case where the signal eq1 is 0 and the signal eq2 is 1,
(3A) the flag CF is set to 1 when Xmin<x1≤Xmax, and
(3B) the flag is set to 0 in any other cases.
(4) In a case where the signal eq1 is 1 and the signal eq2 is 1,
(4A) the flag CF is set to 1 when Xmin≤x1≤Xmax, and
(4B) the flag is set to 0 in any other cases.

In cycle 2, the range determination arithmetic unit S14 determines whether the value src (=x1) output from the register file unit 2 falls within the particle range defined by the limits (the highest value and lowest value) Xmax and Xmin, and then outputs a condition flag CF indicating the determination result to the conditional register unit 4.

In cycle 2, the load-store unit S31 in the third slot loads positional information x2 of a second particle from the data memory M2. The loaded information about the coordinate position x2 of the second particle is output to the register file unit 2 through the data path Do3.

In cycle 2, the random-number generating unit S22 in the second slot S2 generates a variation Δx2 (Δx2 is a real number) to be added to the positional information (X-coordinate position) x2 of the second particle, and outputs the generated variation Δx2 to the register file unit 2 through the data path Do2. The register file unit 2 stores the variation Δx2 into a predetermined register.

Cyc3:

In cycle 3, the instruction control unit 1 provides a conditional addition instruction (Addt instruction) to the instruction execution unit 3. The conditional adder unit S21 in the second slot S2 of the instruction execution unit 3 performs conditional addition in accordance with the conditional addition instruction (Addt instruction). More specifically, the conditional adder unit S21 receives the first-particle-positional information x1 and its variation Δx1 from the register file unit 2, and performs conditional addition using the addition result x1+Δx1 for the first particle in accordance with the control signal CFctl output from the conditional register unit 4.

When the range determination arithmetic unit S14 determines that the addition result x1+Δx1 for the first particle falls within the range defined by the particle limits Xmin and Xmax in cycle 2, the flag CF is set to 1. The conditional register unit 4 sets the signal value of the control signal CFctl to 1 in accordance with the value of the condition flag CF, and outputs the signal to the conditional adder unit S21. The conditional adder unit S21 then adds up the positional information x1 of the first particle and its variation Δx1, because the signal value of the control signal CFctl is 1. In other words, the conditional adder unit S21 outputs the addition value to the register file unit 2 through the data path Do2. The register file unit 2 stores the addition value output from the conditional adder unit S21 into a predetermined register as the rearrangement position for the first particle (the coordinate position determined by the prior probability distribution at the next timestep, or time t+1).

When the range determination arithmetic unit S14 determines that the addition result x1+Δx1 for the first particle is not a value within the range defined by the particle limits Xmin and Xmax in cycle 2, the flag CF is set to 0. The conditional register unit 4 sets the signal value of the control signal CFctl to 0 in accordance with the value of the condition flag CF, and outputs the signal to the conditional adder unit S21. The conditional adder unit S21 does not add up the coordinate position x1 of the first particle and its variation Δx1, because the signal value of the control signal CFctl is 0. In this case, the conditional adder unit S21 calculates no relocation position for the first particle (i.e. no coordinate position determined by the prior probability distribution at the next timestep, or time t+1).

In cycle 3, the load-store unit S31 in the third slot loads the coordinate positional information x3 of a third particle from the data memory M2. The loaded information about the coordinate position x3 of the next particle is output to the register file unit 2 through the data path Do3.

In cycle 3, the instruction control unit 1 provides an addition instruction (Add) to the instruction execution unit 3. The adder unit S11 in the first slot S1 of the instruction execution unit 3 adds up the X-coordinate positional information x2 of the second particle and its variation Δx2, both of which are generated in cycle 2 in accordance with the addition instruction (Add). The adder unit S11 outputs the addition result x2+Δx2 to the register file unit 2 through the data path Do1.

Cyc4:

In cycle 4, the instruction control unit 1 provides a store instruction (Store) to the instruction execution unit 3. The load-store unit S31 in the third slot S3 of the instruction execution unit 3 stores the X-coordinate position of the first particle obtained (determined) in cycle 3 into the data memory M2 in accordance with the store instruction.

In cycle 4, the second slot S2 executes a Rand instruction in the same manner as for the Rand instruction used in cycle 0 to generate a variation Δx3 of the third particle.

In cycle 4, the first slot S1 executes an Add instruction as in cycle 1 to add up the coordinate position x2 of the second particle and its variation Δx2.

Cyc5 and Subsequent Cycles:

In Cycle 5 and subsequent cycles, the same processing as described above is performed in accordance with the schedule of instructions shown in FIG. 8. Such processing enables determination of the coordinate position of each of the second and subsequent particles.

The above embodiment describes the operation of the SIMD processor 1000 performed when the range direction setting signal dir is 0. More specifically, The embodiment describes the operation for determining whether the processing target value falls within the range defined by the first register value val1 (=Xmin) and the second register value val2 (=Xmax). In the SIMD processor 1000, in a case where the range direction setting signal dir is 0, (1) the condition flag is set to 1 when the processing target value src falls within the range defined by the first register value val1 (=Xmin) and the second register value val2 (=Xmax), and (2) the condition flag is set to 0 when the processing target value src fails to fall within the range defined by the first register value val1 (=Xmin) and the second register value val2 (=Xmax).

When the range direction setting signal dir is set to 1, the SIMD processor 1000 can also determine whether the processing target value is fails to fall within the range defined by the first register value val1 (=Xmin) and the second register value val2 (=Xmax). In the SIMD processor 1000 in a case where the range direction setting signal dir is 1, (1) the condition flag is set to 1 when the target value src fails to fall within the range defined by the first register value val1 (=Xmin) and the second register value val2 (=Xmax), and (2) the condition flag is set to 0 when the target value src falls within the range defined by the first register value val1 (=Xmin) and the second register value val2 (=Xmax).

As described above, the SIMD processor 1000 (1) sets the control signal range to 0 and performs the processing described above in 1.2.1 to implement the HOG calculation process, and (2) sets the control signal range to 1 and performs the processing described above in 1.2.2 to implement particle filtering.

More specifically, the SIMD processor 1000 can create the conditions under which the range determination arithmetic unit S14 outputs the condition flag CF set at 1 by setting the control signal range, the range direction setting signal dir, the first equivalence control signal eq1, and the second equivalence control signal eq2 to predetermined values. FIG. 9 is a relational table showing relationship between the conditions under which the range determination arithmetic unit S14 outputs the conditional flag CF set at 1 and the following signals: the control signal range, the range direction setting signal dir, the first equivalence control signal eq1, and the second equivalence control signal eq2.

In the SIMD processor 1000, the conditional register unit 4 generates a control signal CFctl for controlling a predetermined operation unit to perform a conditional operation based on the conditional flag CF obtained from the relational table of FIG. 9. The predetermined operation unit performs the conditional operation in accordance with the control signal CFctl. This eliminates the need for hardware used to set the condition flag for an operator of each slot (each processor element) in the SIMD processor 1000, and reduces the hardware scale as compared with the techniques known in the art.

The SIMD processor 1000 can perform various range determination processes by setting the control signal range, the range direction setting signal dir, the first equivalence control signal eq1, and the second equivalence control signal eq2 and to predetermined values and setting the first register value val1, the second register value val2, and the output value src from the register file unit 2 to predetermined values. For example, Setting the boundary values (histL1, histL2, . . . ) used in the histogram calculation process to predetermined values as described above in 1.2.1 enables the range of one bin to be easily changed (or to variable).

The SIMD processor 1000 with the versatile hardware configuration efficiently implements such range determination that is frequently used in image processing and recognition.

Other Embodiments

Although the range determination arithmetic unit S14 in the above embodiment has the hardware configuration shown in FIGS. 2 to 5, the embodiment should not be limited to this configuration. The range determination arithmetic unit S14 may have any other circuit configuration that satisfies the relationship in the relational table of FIG. 9. The range determination arithmetic unit S14 may also include a lookup table to satisfy the relationship in the relational table of FIG. 9.

The range determination arithmetic unit S14 should not be limited to the hardware configuration shown in FIGS. 2 to 5.

The range determination arithmetic unit S14 may have any other circuit configuration that satisfies the relationship in the relational table of FIG. 9. For example, the first comparator 305 (or the second comparator 306) shown in FIG. 4 may be a circuit corresponding to the logical expression below:

(!cctl & !MSB & ROR)|(eq & !ROR)|(cctl & MSB)

where MSB is the most significant bit of subtraction result data Dsub, eq is an equivalence control signal (a first equivalence control signal eq1 or a second equivalence control signal eq2), cctl is a control signal cctl1 output from the control signal generation unit 303, and ROR is an output from the non-zero determiner 3052.

In the above logical expression, ROR, MSB, eq, and cctl can each have a logical value of 0 or 1.

Although the instruction execution unit 3 in the SIMD processor 1000 of the above embodiment includes the three slots, the instruction execution unit 3 may include another number of slots.

Although the SIMD processor 1000 in the above embodiment includes the conditional adder unit S21 in the second slot S2 as a conditional operation unit, the embodiment should not be limited to this structure. For example, the SIMD processor 1000 may include another conditional operation unit. Also, the SIMD processor 1000 may include the operation units allocated in a manner different from the operation units shown in FIG. 1 without departing from the scope and the spirit of the present invention.

Part or all of the above embodiment may be combined.

The processes described in the above embodiment may not be performed in the order specified in the above embodiment. The order in which the processes are performed may be changed without departing from the scope and the spirit of the invention.

The term "unit" herein may include "circuitry," which may be partly or entirely implemented by using either hardware or software, or both hardware and software.

The specific structures described in the above embodiment of the present invention are mere examples, and may be changed and modified variously without departing from the scope and the spirit of the invention.

APPENDIXES

The present invention may also be expressed in the following forms.

A first aspect of the invention provides a SIMD processor including an instruction control unit, a register file unit, a conditional register unit, an instruction execution unit, a first register, a second register, a selector, a control signal generation unit, a first comparator, a second comparator, and a concatenation unit The instruction control unit performs instruction fetching and instruction decoding, and generates a range control signal, a range direction setting signal, a first equivalence control signal, and a second equivalence control signal for performing predetermined operations.

The register file unit includes a plurality of registers including a register storing source data.

The conditional register unit stores a condition flag, and generates a condition control signal for performing a conditional operation in accordance with the condition flag.

The instruction execution unit includes a first slot including a range determination arithmetic unit.

The range determination arithmetic unit receives the source data from the register file unit. The range determination arithmetic unit includes a first register, a second register, a selector, a control signal generation unit, a first comparator, a second comparator, and a concatenation unit.

The first register stores a first register value.

The second register stores a second register value.

The selector selects one of the source data received from the register file unit and the second register value in accordance with the range control signal.

The control signal generation unit generates a first comparison control signal, a second comparison control signal, and a concatenation control signal in accordance with the range control signal and the range direction setting signal.

The first comparator compares a value output from the selector with the first register value in accordance with the first comparison control signal generated by the control signal generation unit and the first equivalence control signal to generate first comparison data indicating a result of the comparison.

The second comparator compares the source data with the second register value in accordance with the second comparison control signal generated by the control signal generation unit and the second equivalence control signal to generate second comparison data indicating a result of the comparison.

The concatenation unit concatenates the first comparison data with the second comparison data in accordance with the concatenation control signal to generate the condition flag.

The first register updates the first register value with the source data when the range control signal is inactive.

The conditional register unit stores the condition flag generated by the concatenation unit.

The SIMD processor includes the range determination arithmetic unit including the first and second registers that can store two values. The SIMD processor uses three values, namely, these two values and the value of the source data input from the register file unit, to flexibly set the processing target data for range determination and the two boundaries defining the processing target range of range determination.

The SIMD processor includes the range determination arithmetic unit including the two comparators, or the first comparator and the second comparator. The SIMD processor can flexibly change the comparison target data and the range of comparison by using the range control signal, the range direction setting signal, the first equivalence control signal, and the second equivalence control signal, and can output the determination result indicating whether the processing target data is included in the set range as the condition flag CF.

In this SIMD processor, the first register value of the first register is updated using the source data when the range control signal is inactive. Thus, the range of the determination may be easily changed for every cycle. This enables this SIMD processor to efficiently perform range determination in the histogram calculation (determination as to whether the processing target data is included in each bin), for example.

This SIMD processor with the highly versatile hardware configuration efficiently performs range determination that is frequently used in image processing and image recognition.

The "inactive" signal has a value corresponding to 0 in positive logic, and has a value corresponding to 1 in negative logic. The "active" signal has a value corresponding to 1 in positive logic, and has a value corresponding to 0 in negative logic.

A second aspect of the invention provides the SIMD processor of the first aspect of the invention in which when providing a range determination instruction to the instruction execution unit, the instruction control unit outputs the range control signal, the range direction setting signal, the first equivalence control signal, and the second equivalence control signal for performing processing to generate the condition flag to the range determination arithmetic unit, and allows the range determination arithmetic unit to perform processing to generate the condition flag.

In this SIMD processor, the instruction control unit provides the range determination instruction to the instruction execution unit, allowing the range determination arithmetic unit to perform processing to generate the condition flag.

A third aspect of the invention provides the SIMD processor of one of the first or second aspect of the invention in which (1) when performing histogram calculation and determining whether processing target data falls within a range of a predetermined bin that is used to calculate a histogram, the instruction control unit sets a signal value of the range control signal to 0, and the selector selects the second register value in accordance with the range control signal, and (2) when determining whether the processing target data falls within a range defined by the first register value and the second register value, the instruction control unit sets the signal value of the range control signal to 1, and the selector selects the source data input from the register file unit in accordance with the range control signal.

The SIMD processor sets the signal value of the range control signal to achieve both (1) the range determination changing the range of the determination for every cycle, like the range determination used in the histogram calculation, and (2) the range determination with the fixed range of the determination for a predetermined period. This enables the SIMD processor to perform the two different processes described above using the same hardware configuration.

The signal values of 1 and 0 are logical values. For example, positive logic allocates a value of 1 to a signal at a level higher than a predetermined level (H signal), and a value of 0 to a signal with a level lower than a predetermined level (L signal).

A fourth aspect of the invention provides the SIMD processor of one of the first to third aspects of the invention in which when performing histogram calculation and determining whether a processing target data falls within a range of a predetermined bin that is used to calculate a histogram, (1) the instruction control unit sets a signal value of the range direction setting signal to 0 to set a value of the condition flag to 1 when the processing target data falls within the range of the bin, and (2) the instruction control unit sets the signal value of the range direction setting signal to 1 to set the value of the condition flag to 1 when the processing target data is outside the range of the bin.

The SIMD processor can select one of the following two processes: setting the value of the condition flag to 1 when the processing target data falls within the range, and setting the value of the condition flag to 1 when the processing target data does not fall within the range by setting the signal value of the range direction setting signal.

A fifth aspect of the invention provides the SIMD processor of one of the first to fourth aspects of the invention in which (1) when a signal value of the first equivalence control signal generated by the instruction control unit is set at 1, the range determination arithmetic unit outputs the condition flag set at 1 in range determination performed for the processing target data when the processing target data is equal to a first boundary value that is a smaller one of two boundary values defining a range of the determination, and (2) when a signal value of the second equivalence control signal generated by the instruction control unit is set at 1, the range determination arithmetic unit outputs the condition flag set at 1 in range determination performed for the processing target data when the target data is equal to a second boundary value that is a greater one of two boundary values defining the range of the determination.

The SIMD processor can select outputting the value of the condition flag set at 1 when the processing target data is equal to the boundary value defining the range of the determination or not based on the signal value of the first equivalence control signal and/or the second equivalence control signal.

A sixth aspect of the invention provides the SIMD processor of one of the first to fifth aspects of the invention in which the control signal generation unit (1) sets a signal value of the first comparison control signal to 1 when a signal value of the range control signal is 1 and a signal value of the range direction setting signal is 1, and sets the signal value of the first comparison control signal to 0 in any other cases, (2) sets a signal value of the second comparison control signal to 1 when the signal value of the range control signal is 1 and the signal value of the range direction setting signal is 0, and sets the signal value of the second comparison control signal to 0 in any other cases, and (3) sets a signal value of the concatenation control signal to 1 when the signal value of the range control signal is 1 and the signal value of the range direction setting signal is 1, and sets the signal value of the concatenation control signal to 0 in any other cases.

The SIMD processor can include the control signal generation unit that generates various control signals under the above conditions.

A seventh aspect of the invention provides the SIMD processor of the sixth aspect of the invention in which the first comparator performs the processing described below.

(1) When the signal value of the first comparison control signal is 0 and a signal value of the first equivalence control signal is 0, the first comparator outputs data D1out set at 1 when first input data Din11 and second input data Din12 that are input into the first comparator satisfy the relationship $Din11 > Din12$, and outputs data D1 out set at 0 when $Din11 \leq Din12$.

(2) When the signal value of the first comparison control signal is 0 and the signal value of the first equivalence control signal is 1, the first comparator outputs the data D1 out set at 1 when the first input data Din11 and the second input data Din12 satisfy the relationship $Din11 \geq Din12$, and outputs the data D1out set at 0 when $11 < Din12$.

(3) When the signal value of the first comparison control signal is 1 and the signal value of the first equivalence control signal is 0, the first comparator outputs the data D1out set at 1 when the first input data Din11 and the second input data Din12 satisfy the relationship $Din11 > Din12$, and outputs the data D1out set at 0 when $Din11 \geq Din12$.

(4) When the signal value of the first comparison control signal is 1 and the signal value of the first equivalence control signal is 1, the first comparator outputs the data D1out set at 1 when the first input data Din11 and the second input data Din12 satisfy the relationship $Din11 \leq Din12$, and outputs the data D1out set at 0 when $Din11 > Din12$.

The SIMD processor can include the first comparator that generates a signal indicating a comparison result.

An eighth aspect of the invention provides the SIMD processor of the sixth or seventh aspect of the invention in which the second comparator performs the processing described below.

(1) When the signal value of the second comparison control signal is 0 and a signal value of the second equivalence control signal is 0, the second comparator outputs data D2out set at 1 when first input data Din21 and second input data Din22 that are input into the second comparator satisfy the relationship $Din21 > Din22$, and outputs data D2out set at 0 when $Din21 \leq Din22$.

(2) When the signal value of the second comparison control signal is 0 and the signal value of the second equivalence control signal is 1, the second comparator outputs the data D2out set at 1 when the first input data Din21 and the second input data Din22 satisfy the relationship $Din21 \geq Din22$, and outputs the data D2out set at 0 when $Din21 < Din22$.

(3) When the signal value of the second comparison control signal is 1 and the signal value of the second equivalence control signal is 0, the second comparator outputs the data D2out set at 1 when the first input data Din21 and the second input data Din22 satisfy the relationship $Din21 < Din22$, and outputs the data D2out set at 0 when $Din21 \leq Din22$.

(4) When the signal value of the first comparison control signal is 1 and the signal value of the second equivalence control signal is 1, the second comparator outputs the data D2out set at 1 when the first input data Din21 and the second input data Din22 satisfy the relationship $Din21 \leq Din22$, and outputs the data D2out set at 0 when $Din21 > Din22$.

The SIMD processor can include the second comparator that generates a signal indicating a comparison result.

A ninth aspect of the invention provides the SIMD processor of one of the sixth to eighth aspects of the invention in which the concatenation unit includes an AND gate, an OR gate, and a second selector.

The AND gate receives an output from the first comparator and an output from the second comparator. The AND gate performs an AND operation of the output from the first comparator and the output from the second comparator.

The OR gate receives the output from the first comparator and the output from the second comparator and perform an OR operation of the output from the first comparator and the output from the second comparator.

The second selector selectively outputs one of the output from the AND gate and the output from the OR gate. The second selector selectively outputs the output from the AND gate when the signal value of the concatenation control signal is 0, and selectively outputs the output from the OR gate when the signal value of the concatenation control signal is 1.

The SIMD processor can include the concatenation unit that generates a concatenation control signal under the above conditions.

A tenth aspect of the invention provides the SIMD processor of one of the first to ninth aspects of the invention in which when performing histogram calculation and determining whether processing target data falls within a range of a predetermined bin that is used to calculate a histogram, the instruction control unit sets a lower limit of the histogram to the first register value of the first register, and provides the instruction execution unit with a write instruction for setting the processing target data to the second register value of the second register before providing a range determination instruction to the instruction execution unit.

The SIMD processor can provide a write instruction before performing the range determination and set the boundary value used for the range determination to the first register value and/or the second register value.

An eleventh aspect of the invention provides the SIMD processor of one of the first to tenth aspects of the invention in which when determining whether processing target data falls within a range defined by the first register value and the second register value, the instruction control unit provides the instruction execution unit with a write instruction for setting a lower limit of a target range of the range determination instruction to the first register value of the first register and setting an upper limit of the target range of the range determination instruction to the first register value of the second register before providing a range determination instruction to the instruction execution unit.

The SIMD processor can provide a write instruction before the range determination and set the boundary value used for the range determination to the first register value and/or the second register value.

A twelfth aspect of the invention provides the SIMD processor of one of the first to eleventh aspects of the invention in which the instruction execution unit further includes a second slot and a third slot.

The second slot includes an input port that receives output data of N×2 bits from the register file unit, and an output port that outputs data of N bits to the register file unit (N is a natural number).

The third slot includes an input port that receives output data of N×2 bits from the register file unit, and an output port that outputs data of N bits to the register file unit (N is a natural number).

The first slot further includes an input port that receives output data of N×2 bits from the register file unit (N is a natural number), an output port that outputs data of N bits to the register file unit, and a write arithmetic unit that executes a write instruction for writing data into at least one of the first register and the second register when the instruction control unit provides the write instruction to the instruction execution unit.

The second slot includes a load-store unit that executes at least one of a load instruction and a store instruction.

The third slot includes a conditional adder unit that performs addition when the condition flag is active, and does not perform addition when the condition flag is inactive.

This enables this SIMD processor to perform efficient range determination. More specifically, the SIMD processor includes separate slots for performing range determination, loading and storing data, and performing conditional operations, thus improving the efficiency of parallel processing. As a result, the SIMD processor improves the computation efficiency in conditional determination, such as range determination.

What is claimed is:

1. A SIMD processor, comprising:
   an instruction control unit configured to perform instruction fetching and instruction decoding, and generate a range control signal, a range direction setting signal, a first equivalence control signal, and a second equivalence control signal for performing predetermined operations;
   a register file unit including a plurality of registers, the plurality of registers including a register storing source data;
   a conditional register unit configured to store a condition flag, and generate a condition control signal for performing a conditional operation in accordance with the condition flag; and
   an instruction execution unit including a first slot, the first slot including a range determination arithmetic unit,
   the range determination arithmetic unit being configured to receive the source data from the register file unit,
   the range determination arithmetic unit including
   a first register configured to store a first register value,
   a second register configured to store a second register value,
   a selector configured to select one of the source data received from the register file unit and the second register value in accordance with the range control signal,
   a control signal generation unit configured to generate a first comparison control signal, a second comparison control signal, and a concatenation control signal in accordance with the range control signal and the range direction setting signal,
   a first comparator configured to compare a value output from the selector with the first register value in accordance with the first comparison control signal generated by the control signal generation unit and the first equivalence control signal to generate first comparison data indicating a result of the comparison,
   a second comparator configured to compare the source data with the second register value in accordance with the second comparison control signal generated by the control signal generation unit and the second equivalence control signal to generate second comparison data indicating a result of the comparison, and
   a concatenation unit configured to concatenate the first comparison data with the second comparison data in accordance with the concatenation control signal to generate the condition flag,
   wherein the first register updates the first register value with the source data when the range control signal is inactive, and
   the conditional register unit stores the condition flag generated by the concatenation unit.

2. The SIMD processor according to claim 1, wherein when providing a range determination instruction to the instruction execution unit, the instruction control unit outputs the range control signal, the range direction setting signal, the first equivalence control signal, and the second equivalence control signal for performing processing to generate the condition flag to the range determination arithmetic unit, and allows the range determination arithmetic unit to perform processing to generate the condition flag.

3. The SIMD processor according to claim 1, wherein
(1) when performing histogram calculation and determining whether processing target data falls within a range of a predetermined bin that is used to calculate a histogram,
the instruction control unit sets a signal value of the range control signal to 0, and
the selector selects the second register value in accordance with the range control signal, and
(2) when determining whether the processing target data falls within a range defined by the first register value and the second register value,
the instruction control unit sets the signal value of the range control signal to 1, and
the selector selects the source data input from the register file unit in accordance with the range control signal.

4. The SIMD processor according to claim 1, wherein
when performing histogram calculation and determining whether a processing target data falls within a range of a predetermined bin that is used to calculate a histogram, (1) the instruction control unit sets a signal value of the range direction setting signal to 0 to set a value of the condition flag to 1 when the processing target data falls within the range of the bin, and
(2) the instruction control unit sets the signal value of the range direction setting signal to 1 to set the value of the condition flag to 1 when the processing target data is outside the range of the bin.

5. The SIMD processor according to claim 1, wherein
(1) when a signal value of the first equivalence control signal generated by the instruction control unit is set at 1,
the range determination arithmetic unit outputs the condition flag set at 1 in range determination performed for the processing target data when the processing target data is equal to a first boundary value that is a smaller one of two boundary values defining a range of the determination, and
(2) when a signal value of the second equivalence control signal generated by the instruction control unit is set at 1,
the range determination arithmetic unit outputs the condition flag set at 1 in range determination performed for the processing target data when the target data is equal to a second boundary value that is a greater one of two boundary values defining the range of the determination.

6. The SIMD processor according to claim 1, wherein
the control signal generation unit
(1) sets a signal value of the first comparison control signal to 1 when a signal value of the range control signal is 1 and a signal value of the range direction setting signal is 1, and sets the signal value of the first comparison control signal to 0 in any other cases,
(2) sets a signal value of the second comparison control signal to 1 when the signal value of the range control signal is 1 and the signal value of the range direction setting signal is 0, and sets the signal value of the second comparison control signal to 0 in any other cases, and
(3) sets a signal value of the concatenation control signal to 1 when the signal value of the range control signal is 1 and the signal value of the range direction setting signal is 1, and sets the signal value of the concatenation control signal to 0 in any other cases.

7. The SIMD processor according to claim 6, wherein
(1) when the signal value of the first comparison control signal is 0 and a signal value of the first equivalence control signal is 0, the first comparator outputs data D1out set at 1 when first input data Din11 and second input data Din12 that are input into the first comparator satisfy a relationship Din11>Din12, and outputs data D1out set at 0 when Din11≤Din12, and
(2) when the signal value of the first comparison control signal is 0 and the signal value of the first equivalence control signal is 1, the first comparator outputs the data D1out set at 1 when the first input data Din11 and the second input data Din12 satisfy a relationship Din11≥Din12, and outputs the data D1out set at 0 when Din11<Din12,
(3) when the signal value of the first comparison control signal is 1 and the signal value of the first equivalence control signal is 0, the first comparator outputs the data D1out set at 1 when the first input data Din11 and the second input data Din12 satisfy a relationship Din11<Din12, and outputs the data D1out set at 0 when Din11≥Din12, and
(4) when the signal value of the first comparison control signal is 1 and the signal value of the first equivalence control signal is 1, the first comparator outputs the data D1out set at 1 when the first input data Din11 and the second input data Din12 satisfy a relationship Din11≤Din12, and outputs the data D1out set at 0 when Din11>Din12.

8. The SIMD processor according to claim 6, wherein
(1) when the signal value of the second comparison control signal is 0 and a signal value of the second equivalence control signal is 0, the second comparator outputs data D2out set at 1 when first input data Din21 and second input data Din22 that are input into the second comparator satisfy a relationship Din21>Din22, and outputs data D2out set at 0 when Din21≤Din24,
(2) when the signal value of the second comparison control signal is 0 and the signal value of the second equivalence control signal is 1, the second comparator outputs the data D2out set at 1 when the first input data Din21 and the second input data Din22 satisfy a relationship Din21≥Din24, and outputs the data D2out set at 0 when Din21<Din22,
(3) when the signal value of the second comparison control signal is 1 and the signal value of the second equivalence control signal is 0, the second comparator outputs the data D2out set at 1 when the first input data Din21 and the second input data Din22 satisfy a relationship Din21<Din22, and outputs the data D2out set at 0 when Din21≥Din22, and
(4) when the signal value of the first comparison control signal is 1 and the signal value of the second equivalence control signal is 1, the second comparator outputs the data D2out set at 1 when the first input data Din21 and the second input data Din22 satisfy a relationship Din21≤Din22, and outputs the data D2out set at 0 when Din21>Din22.

9. The SIMD processor according to claim 6, wherein
the concatenation unit includes
an AND gate configured to receive an output from the first comparator and an output from the second comparator and perform an AND operation of the output from the first comparator and the output from the second comparator,
an OR gate configured to receive the output from the first comparator and the output from the second comparator and perform an OR operation of the output from the first comparator and the output from the second comparator, and
a second selector configured to selectively output one of the output from the AND gate and the output from the OR gate, and
the second selector selectively outputs the output from the AND gate when the signal value of the concatenation control signal is 0, and selectively outputs the output from the OR gate when the signal value of the concatenation control signal is 1.

10. The SIMD processor according to claim 1, wherein
when performing histogram calculation and determining whether processing target data falls within a range of a predetermined bin that is used to calculate a histogram,
the instruction control unit sets a lower limit of the histogram to the first register value of the first register, and provides the instruction execution unit with a write instruction for setting the processing target data to the second register value of the second register before providing a range determination instruction to the instruction execution unit.

11. The SIMD processor according to claim 1, wherein
when determining whether processing target data falls within a range defined by the first register value and the second register value,
the instruction control unit provides the instruction execution unit with a write instruction for setting a lower limit of a target range of the range determination instruction to the first register value of the first register and setting an upper limit of the target range of the range determination instruction to the first register value of the second register before providing a range determination instruction to the instruction execution unit.

12. The SIMD processor according to claim 1, wherein the instruction execution unit further includes
a second slot including an input port configured to receive output data of N×2 bits from the register file unit, and an output port configured to output data of N bits to the register file unit, where N is a natural number; and
a third slot including an input port configured to receive output data of N×2 bits from the register file unit, and an output port configured to output data of N bits to the register file unit, where N is a natural number,
the first slot further includes
an input port configured to receive output data of N×2 bits from the register file unit, where N is a natural number,
an output port configured to output data of N bits to the register file unit, and
a write arithmetic unit configured to execute a write instruction for writing data into at least one of the first register and the second register when the instruction control unit provides the write instruction to the instruction execution unit,
the second slot includes a load-store unit configured to execute at least one of a load instruction and a store instruction, and
the third slot includes a conditional adder unit configured to perform addition when the condition flag is active, and configured not to perform addition when the condition flag is inactive.

* * * * *

UNITED STATES PATENT AND TRADEMARK OFFICE
CERTIFICATE OF CORRECTION

PATENT NO.          : 9,886,281 B2
APPLICATION NO.     : 14/660253
DATED               : February 6, 2018
INVENTOR(S)         : Shohei Nomoto It is certified that error appears in the above-identified patent and that said Letters Patent is hereby corrected as shown below:

On the Title Page

Item (54) and in the Specification, Column 1, Line 1 should read:
--SIMD PROCESSOR FOR COMPARING IMAGES USING RANGE ARITHMETIC--

Signed and Sealed this
Twelfth Day of February, 2019

Andrei Iancu
*Director of the United States Patent and Trademark Office*